(12) United States Patent
Miyashita et al.

(10) Patent No.: US 7,018,054 B2
(45) Date of Patent: *Mar. 28, 2006

(54) ELECTRO-OPTICAL DEVICE ENCASED IN MOUNTING CASE, PROJECTION DISPLAY APPARATUS, AND MOUNTING CASE

(75) Inventors: Tomoaki Miyashita, Shimosuwa-machi (JP); Hiroyuki Kojima, Suwa (JP); Hiromi Saitoh, Chino (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/725,420

(22) Filed: Dec. 3, 2003

(65) Prior Publication Data

US 2004/0169783 A1 Sep. 2, 2004

(30) Foreign Application Priority Data

Dec. 20, 2002 (JP) .............................. 2002-370075

(51) Int. Cl.
  *G03B 21/16* (2006.01)
  *G02F 1/1335* (2006.01)
  *G02F 1/03* (2006.01)
  *H02K 7/20* (2006.01)

(52) U.S. Cl. .................... 353/119; 353/60; 353/61; 349/58; 349/161; 361/688; 361/703; 361/704; 359/245; 348/748

(58) Field of Classification Search ................. 353/119, 353/30, 31, 34, 37, 52, 60, 61; 359/237, 359/245, 246, 249; 348/739, 744, 748, 750, 348/751, 759; 349/5, 8, 58, 60, 161; 361/688, 361/703, 704
See application file for complete search history.

(56) References Cited

U.S. PATENT DOCUMENTS 5,170,195 A * 12/1992 Akiyama et al. ............. 353/54
2004/0136146 A1* 7/2004 Saitoh et al. ............... 361/600

FOREIGN PATENT DOCUMENTS

| JP | 03-149521 | 6/1991 |
|---|---|---|
| JP | 04-125538 | 4/1992 |
| JP | 6-67143 | 3/1994 |
| JP | 6-55134 | 7/1994 |
| JP | 6-265855 | 9/1994 |
| JP | 7-248480 | 9/1995 |
| JP | A1 WO98/36313 | 8/1998 |
| JP | 10-232629 | 9/1998 |
| JP | 10-319379 | 12/1998 |
| JP | 11-84350 | 3/1999 |

(Continued)

Primary Examiner—W. B. Perkey
Assistant Examiner—Rochelle Blackman
(74) Attorney, Agent, or Firm—Oliff & Berridge, PLC

(57) ABSTRACT

An electro-optical apparatus encased in the mounting case includes an electro-optical device in which the light emitted from a light source is incident on an image display region, and a mounting case including a plate disposed to face one surface of the electro-optical device and a cover to cover the electro-optical device, a portion of the cover abutting against the plate, wherein the mounting case accommodates the electro-optical device by holding at least a portion of a peripheral region located at the circumference of the image display region of the electro-optical device with at least one of the plate and the cover. In addition, the cover has a surface area increasing portion to increase the surface area thereof.

15 Claims, 15 Drawing Sheets

FOREIGN PATENT DOCUMENTS

| | | |
|---|---|---|
| JP | 2000-147472 | 5/2000 |
| JP | 2001-264883 | 9/2001 |
| JP | 2001-318361 | 11/2001 |
| JP | 2002-107698 | 4/2002 |
| JP | 2002-296568 | 10/2002 |
| JP | 2004-045680 | 2/2004 |

* cited by examiner

X1                                                                 X1'

ELECTRO-OPTICAL DEVICE ENCASED IN MOUNTING CASE, PROJECTION DISPLAY APPARATUS, AND MOUNTING CASE

BACKGROUND OF THE INVENTION

1. Field of Invention

The present invention relates to a mounting case to accommodate an electro-optical device, such as a liquid crystal panel, which is used as a light valve of a projection display apparatus, such as a liquid crystal projector, an electro-optical device in a mounting case, in which the electro-optical device is accommodated or encased in the mounting case, and a projection display apparatus including the electro-optical device encased in the mounting case.

2. Description of Related Art

In the related art generally, when a liquid crystal panel is used as a light valve of a liquid crystal projector, the liquid crystal panel is not provided in an exposed state on a console, etc., constituting the liquid crystal projector. But it is accommodated or encased in a suitable mounting case. Then the mounting case including the liquid crystal panel is provided on the console. Herein, the liquid crystal panel can be easily fixed to the console by suitable screw holes provided in the mounting case.

In the liquid crystal projector, source light emitted from a light source is projected on the liquid crystal panel in the mounting case as focused light. Light passing through the liquid crystal panel is enlarged and projected on the screen to display images. In such a liquid crystal projector, since the enlarged projection is generally predetermined, relatively intensive light emitted from a light source, such as a metal halide lamp, is used.

However, in this construction, first, there is a problem in which the temperature of the liquid crystal panel in the mounting case rises. The rise in temperature causes the rise in temperature of the liquid crystal interposed between a pair of transparent substrates in the liquid crystal panel. Therefore, the characteristics of the liquid crystal are deteriorated. In addition, when the light emitted from the source light is uneven, the liquid crystal panel is partially heated, and then the deviation of its transmittance is generated by the so-called hot spots. Thus, the quality of projected images deteriorates.

Techniques to prevent the rise in temperature of the liquid crystal panel include an approach to prevent the rise in temperature of the liquid crystal panel by providing a radiating sheet between the liquid crystal panel and a radiating plate in a liquid crystal display module including the liquid crystal panel and a package for holding and accommodating the liquid crystal panel and having the radiating plate.

In addition, in order to address the problem, other approaches, such as an approach of providing a light shielding film on a substrate located at the side of the liquid crystal panel on which light is incident and an approach of forming the mounting case, in which the liquid crystal panel is held or accommodated, using a light reflective material, have been known.

However, the related art approaches to prevent the rise in temperature of the liquid crystal panel have the following problems. As long as intensive light is emitted from the light source, the problem of the rise in temperature of the liquid crystal panel may occur at any time. Therefore, in order to obtain still higher image quality, more effective measures to reduce or prevent the rise in temperature are required instead of or in addition to the aforementioned approaches.

For example, according to the approach of using the radiating sheet, the heat accumulated in the liquid crystal panel can be effectively radiated. However, assuming that the radiating plate or the radiating sheet is provided to cover the entire surface of the substrate, the approach can be used for a reflective liquid crystal panel, but cannot be used for a transmissive liquid crystal panel.

In addition, according to the approach of reflecting light by the light shielding film and the mounting case, as the areas of the light shielding film and the mounting case increase, the amount of the reflected light increases. Thus, the rise in temperature of the liquid crystal panel can be reduced or prevented. However, if the amount of the reflected light increases indiscriminately, the stray light increases in the housing to accommodate the liquid crystal panel in the mounting case. Thus, the quality of images can be deteriorated. In addition, since the increase of the area of the light shielding film causes the reduction of the amount of the light from the source light, which is to be originally incident to and to pass through the liquid crystal panel, the image can be darkened. Thus, it is contrary to the aforementioned purpose in which the intensive light is used in order to display a brighter image. Accordingly, the aforementioned related art approaches do not have a total solution for the above problems.

SUMMARY OF THE INVENTION

The present invention is contrived to address the above problems. The present invention is to provide an electro-optical device encased in a mounting case capable of effectively suppressing the rise in temperature of the electro-optical device, to which relatively intensive light is incident, and a projection display apparatus including the electro-optical device encased in the mounting case. In addition, the present invention provides a mounting case suitable to mount the electro-optical device.

In order to achieve the above, an electro-optical device in a mounting case of an aspect of the present invention and having an image display region, on which projection light from a light source is incident, includes the electro-optical device including a mounting case, a plate disposed to face one surface of the electro-optical device and a cover to cover the electro-optical device, a portion of the cover abutting against the plate, the mounting case accommodating the electro-optical device by holding at least a portion of a peripheral region located in the circumference of the image display region of the electro-optical device with at least one of the plate and the cover. In addition, the cover has a surface area increasing portion to increase the surface area thereof.

According to the electro-optical device encased in the mounting case of an aspect of the present invention, the electro-optical device having the image display region, on which the projection light from the light source is incident, is accommodated into the mounting case including a cover and a plate. The electro-optical device includes, for example, a liquid crystal device or a liquid crystal panel which is mounted as a light valve of the projection display apparatus. In addition, the mounting case may have an additional function, such as a light shielding function, to prevent the leakage of light in the peripheral region of the electro-optical device and the influx of the stray light from the peripheral region to the image display region by partially covering at least a portion of the peripheral region of the electro-optical device.

In addition, in an aspect of the present invention, the cover particularly has the surface area increasing portion to increase its own surface area. Thus, it is possible to increase the heat radiating capability of the cover, and thus to effectively cool the electro-optical device. This is obtained as follows.

First, when projected light is incident on the electro-optical device, the temperature of the electro-optical device rises. Then, the heat generated from the electro-optical device is directly transferred to at least one of the plate and the cover holding the peripheral region, or the heat transferred to the plate is directly transferred to the cover through the abutting portion. In this case, the plate and the cover function as a heat sink of the electro-optical device. In an aspect of the present invention, since the cover has the surface area increasing portion, the heat radiating capability and the cooling capability of the cover can be enhanced. Therefore, the cover is substantially always kept in a suitably cooled state. This means that the cover functions as an excellent heat sink as described above.

As a result, according to an aspect of the present invention, the effective cooling of the electro-optical device can be realized. Therefore, in an aspect of the present invention, since defects due to the rise in temperature of the electro-optical device, such as the deterioration of the characteristics of a liquid crystal layer constituting the electro-optical device or the occurrence of hot spots in the liquid crystal layer, do not occur, it is possible to display high-quality images.

According to an aspect of the electro-optical device in the mounting case of the present invention, the cover has a sidewall portion facing a side surface of the electro-optical device, and the surface area increasing portion increases the surface area of the sidewall portion.

According to the aspect, the increased surface area of the cover by the surface area increasing portion is the sidewall portion. Herein, since the sidewall portion corresponds to a portion opposite to the side surface of the electro-optical device as described above, an occupation ratio of the sidewall portion over the entire cover is originally large. In the aspect, since the surface area increasing portion is provided to the sidewall portion occupying a relatively large area of the entire cover area, it is possible to further effectively increase the area of the entire cover.

Therefore, according to the aspect, the heat radiating capability of the cover can be more effectively enhanced as described above, and thus, the cooling effect on the electro-optical device can be more effectively enhanced.

In another aspect of the electro-optical device encased in the mounting case of an aspect of the present invention, the surface area increasing portion has fins which are protruded from the surface of the cover.

According to the aspect, it is possible to relatively easily increase the surface area of the cover.

In addition, "the fins" described in the aspect may be formed by processes, such as a cutting process, a forging process, a pressing process, an injection molding process, or a casting process when the cover main body is formed or thereafter.

In another aspect of the electro-optical device encased in the mounting case of the present invention, the fins are formed to correspond to the direction of the flow of cooling air which is blown to the electro-optical device encased in the mounting case.

According to the aspect, since the fins are provided to correspond to the direction of the flow of cooling air blown to the electro-optical device encased in the mounting case, the cooling effect of the cover by the fins can be more effectively enhanced.

In other words, if the fins are provided to interrupt the flow of cooling air, it is difficult for the cooling air to be blown beyond the fins, so that the cover cannot effectively cool. However, if the fins are provided to correspond to the direction of the flow of cooling air, the fins do not interrupt the flow of cooling air, so that the cooling air can be blown over the entire cover uniformly. Thus, according to the aspect, the cooling effect on the cover can be effectively enhanced.

In addition, in the aspect, the construction that "the fins are provided to correspond to the direction of the flow of cooling air" specifically includes the following cases. For example, the construction includes the first case that, when the cooling air flows in a straight direction around the cover, the fins are provided to correspond to the direction of the flow of cooling air. The construction includes the second case that, when the cooling air flows in whirls around the cover, the fins are provided to change their forming directions according to the locations of the fins provided on the cover. In addition to the cases, the construction includes another case where, even if the cooling air flows in irregular directions around the electro-optical device in the mounting case, the fins are provided to change their directions so as to correspond to all or a portion of the irregular flow directions according to the locations of the fins provided on the cover.

In another aspect of the electro-optical device encased in the mounting case of the present invention, the fins are provided in a straight shape.

According to the aspect, the surface area of the cover can be increased by the fins protruded in the straight shape. According to the aspect, the heat radiating capability of the cover can be enhanced.

In another aspect of the electro-optical device in the mounting device of the present invention, the fins are arranged in a zigzag shape.

In the aspect, it is generally assumed that the "fins" include a plurality of small fins (which are described later) and the plurality of small fins are arranged in a zigzag shape. More specifically, the fins are arranged "to be alternately disposed between two columns" or "to form in a check shape in plan view". According to the aspect, the surface area of the cover can be increased by the fins protruded in the zigzag shape. Therefore, according to the aspect, the heat radiating capability can be enhanced.

In the aspect, it is preferable that the fins arranged in the zigzag shape should include a first column of fins having a plurality of small fins arranged in parallel to each other and a second column of fins having a plurality of small fins arranged in parallel to each other and extended parallel to the first column of fins, wherein at least one of the small fins constituting the second column of fins is disposed to correspond to a location of a gap between the small fins, which constitute the first column of fins and are adjacent to each other.

According to such a construction, the arrangement of the "fins", which are arranged in the zigzag shape, is more clearly defined. In the aspect, the small fins constituting the first column of fins are formed to alternate with and not to overlap the small fins constituting the second column of fins. For example, if the small fins constituting the first column of fins are indicated by numerals $1(1), 1(2), \ldots, 1(n)$ and the small fins constituting the second column of fins are indicated by numerals $2(1), 2(2), \ldots, 2(n)$, the arrangement aspect is used in which the small fins belonging to the same column (the first column) are not located between the $1(m)$-th small fin and $1(m+1)$-th small fin (herein, m=1, 2, ... n−1) and the 2(m)-th small fin is located in the alternated column, that is, the second column.

According to such a construction, since the small fins are arranged with a suitable density, the heat radiating capability can be highly enhanced. For example, as the aforementioned numerals are used, it is assumed that the 2(m)-th small fin is located to be adjacent to the 1(m)-th small fin. In this case, since heat is radiated from the 2(m)-th and 1(m)-th small fins, the ambient temperature, particularly, the temperature of the air between both small fins rises, and thus, it is difficult to radiate heat from both small fins. However, according to the aspect, since the 1(m)-th small fin is not located to be adjacent to the 2(m)-th small fin, the aforementioned problems cannot occur.

In addition, the expression of the aspect can be replaced with the another expression that "one of the small fins constituting the first column of fins is provided to correspond to the location of the gap between the small fins which constitute the second column of fins and are adjacent to each other".

Furthermore, in the aspect, although only the first and second columns of fins exist, in some case, the third, fourth, or more columns of fins may be provided in addition to the first and second columns of fins. In this case, the relationship between the "first column of fins" and the "second column of fins" can be generally adapted to additional columns. For example, assuming that a total of three columns of fins are provided, the first and second columns of fins meet the relationship between the "first column of fins" and the "second column of fins" in this aspect, and the second and third columns of fins meet the relationship between the "second column of fins" and "the first column of fins" in this aspect.

In such a construction, it is preferable that the gap between the small fins should be longer than a small fin.

According to such a construction, as described above, if one of the small fins constituting the second column of fins is "provided to correspond to the location of the gap between the small fins constituting the first column of fins", the one of the small fins can be wholly provided between the small fins.

Therefore, the heat radiating characteristics of the fins can be more surely enhanced. Thus, according to the construction, since the 2(m)-th small fin and 1(m)-th small fin are not adjacent to each other and a portion of the former does not "overlap" a portion of the latter, each of the small fins can exhibit a sufficient radiating characteristic.

In addition, according to such construction, particularly, the formation of the fins in the zigzag shape can be relatively easily performed. For example, the fins according to the aspect can be suitably formed by an injection molding process as described below. Two molds in a zigzag shape, in which mount parts and valley parts are formed alternately, are prepared. The two molds are disposed in a manner that the mount parts or the valley parts of one mold are engaged with the valley parts or the mount parts of the other mold and a predetermined gap is formed between the top portion of the mount mold and the bottom portion of the valley mold. And then, the injection molding is carried out through the gap, so that the fins arranged in the zigzag shape as described above can be easily obtained. In this case, the mold removal, which is inevitably involved in the aforementioned manufacturing process, can be easily performed. Furthermore, it is preferable that the two molds should be moved apart from each other.

In addition, "the length of the small fin" means the length of the small fin along the direction of the first or second column as clear from the above description.

Furthermore, it is preferable that a pitch between the small fins including the gap between the small fins is 3 mm or more.

According to such a construction, since the pitch between the small fins is properly set, the fins can be more easily formed, and the heat radiating characteristic of the fins can be more effectively enhanced.

Furthermore, it is preferable that a height of the small fins should be 0.5 mm or more and a width of the small fins should be 0.3 mm or more.

According to the construction, since the size of the small fins is properly set, an increase of the surface area of the cover can be surely obtained. Therefore, the heat radiating capability of the cover can be effectively enhanced.

In addition, "the height of small fin" means the length from the tip of fins "protruded from the surface of the cover" to the surface of the cover, and "the width of small fin" means the length of the small fin along a direction crossing the direction of the first or second column.

In another aspect of the electro-optical device encased in the mounting case of the present invention, the fins include a first column of fins and a second column of fins extended in parallel to the first column of fins, and a gap between the first column of fins and the second column of fins is 1 mm or more.

According to the aspect, the fins include the first column of fins and the second column of fins. In this case, when each of "the first column of fins" and "the second column of fins" is arranged in a zigzag shape, "the first column of fins" and "the second column of fins" themselves correspond to "the first column of fins" and "the second column of fins" as described above as they are. In addition to such a case, when the fins are provided in a straight shape, it is considered that the straight fins as "the first column of fins" and the straight fins as "the second column of fins" are provided in two columns.

In addition, in the aspect, the gap between the two columns of fins is 1 mm or more. In this manner, when the cooling air supplies to the electro-optical device encased in the mounting case, the cooling air can be supplied between the two columns of fins uniformly and naturally.

In particular, assuming that the electro-optical device encased in the mounting device of an aspect of the present invention is mounted to a projection display apparatus, the electro-optical device encased in the mounting case and a cooling fan individually provided to the projection display apparatus have to be provided at a long distance, or it is difficult that both of them are arranged to be exactly opposite to each other since generally, additional components are provided to the projection display apparatus. In this case, it is considered that only the cooling air having a low static pressure and a low air volume is supplied to the electro-optical device encased in the mounting case.

In the aspect, since the gap between the two columns of fins is set to a relatively long distance of 1 mm or more, the cooling air having a low static pressure and a low air volume can be supplied between the two columns of fins. According to such construction, since the surface area of the fins, which are exposed to the cooling air, increases, the heat radiating characteristics of the fins can be more enhanced.

Therefore, according to the aspect, it is possible to further enhance the heat radiating capability of the entire cover.

In another aspect of the electro-optical device encased in the mounting case of the present invention, the surface area increasing portion includes a dimple provided to form a concave on the surface of the cover.

According to the aspect, the surface area of the cover can be relatively easily increased.

In addition, the difference between the "dimple" and the "fin" is determined whether they are protruded or concaved from "the surface of the cover" as a reference plane.

In some cases, "the dimple" referred in the aspect may have a property of "never interrupting the flow of the cooling air blown to the electro-optical device encased in the mounting device." It can be understood from the aforementioned point of view that the fins have a property of interrupting the flow of the cooling air a little. And then, the difference between the dimple and the fin may be considered from the above point of view.

In addition, in the aspect, "to form a concave" does not only mean that a process of "forming the concave" needs to be actually performed when forming the dimple on the surface of the cover. In the method of forming the dimple, like the method of forming fins, the dimples can be formed by processes, such as a cutting process, a forging process, a pressing process, an injection molding process, or a casting process when the cover main body is formed or thereafter.

In another aspect of the electro-optical device encased in the mounting case of the present invention, the cover is made of a material having high heat conductivity.

According to the aspect, since the cover is made of the material having high heat conductivity, the heat radiating capability of the cover can be highly enhanced by both of the function and effect due to the surface area increasing portions composed of the fins, the dimples, and the like.

In addition, preferably, "the material having high heat conductivity" specifically includes aluminum, magnesium, copper, or an alloy thereof.

A mounting case of an aspect of the present invention includes a plate disposed to face one surface of an electro-optical device in which the light emitted from a light source is incident on an image display region; and a cover to cover the electro-optical device, the cover having a portion of abutting against the plate, the mounting case accommodating the electro-optical device by holding at least a portion of the peripheral region located at the circumference of the image display region of the electro-optical device with at least one of the plate and the cover, and the cover having a surface area increasing portion to increase the surface area of the cover.

According to the mounting case of an aspect of the present invention, it is possible to provide a mounting case suitable for the electro-optical device encased in the mounting case of the present invention.

In an aspect of the mounting case of an aspect of the present invention, the cover has a sidewall portion facing a side surface of the electro-optical device, and the surface area increasing portion increases the surface area of the sidewall portion.

According to the aspect, in the electro-optical device encased in the mounting case of the present invention, it is possible to provide a mounting case suitable for the aspect in which the cover has a sidewall portion and the surface area increasing portion increases the surface area of the sidewall portion.

In order to achieve the above, a projection display apparatus of an aspect of the present invention includes the aforementioned electro-optical device encased in the mounting case (including their various aspects); the light source; an optical system to guide the light emitted from the light source into the electro-optical device; a projection optical system to project the light emitted from the electro-optical device; and a cooling air discharging portion to supply cooling air to the electro-optical device encased in the mounting case.

According to the projection display apparatus of an aspect of the present invention, it includes the aforementioned electro-optical device encased in the mounting case of an aspect of the present invention. Since the electro-optical device can be effectively cooled by the increase of the surface area of the cover constituting the mounting case and by the cooling air discharging portion provided in the projection display apparatus, it is possible to display high-quality images.

The operation and other advantages of an aspect of the present invention will be apparent from the exemplary embodiments described later.

DETAILED DESCRIPTION OF PREFERRED EMBODIMENTS

Now, exemplary embodiments of the present invention will be described with reference to the accompanying figures.

An Exemplary Embodiment of a Projection Liquid Crystal Apparatus

First, with reference to FIG. 1, an exemplary embodiment of a projection liquid crystal apparatus according to an aspect of the present invention will be described on the basis of an optical system into which optical units are assembled. The projection display apparatus of the exemplary embodiment is constructed using a multi-plate color projector composed of three liquid crystal light valves, which is an example of an electro-optical device encased in a mounting case.

Figure 1:
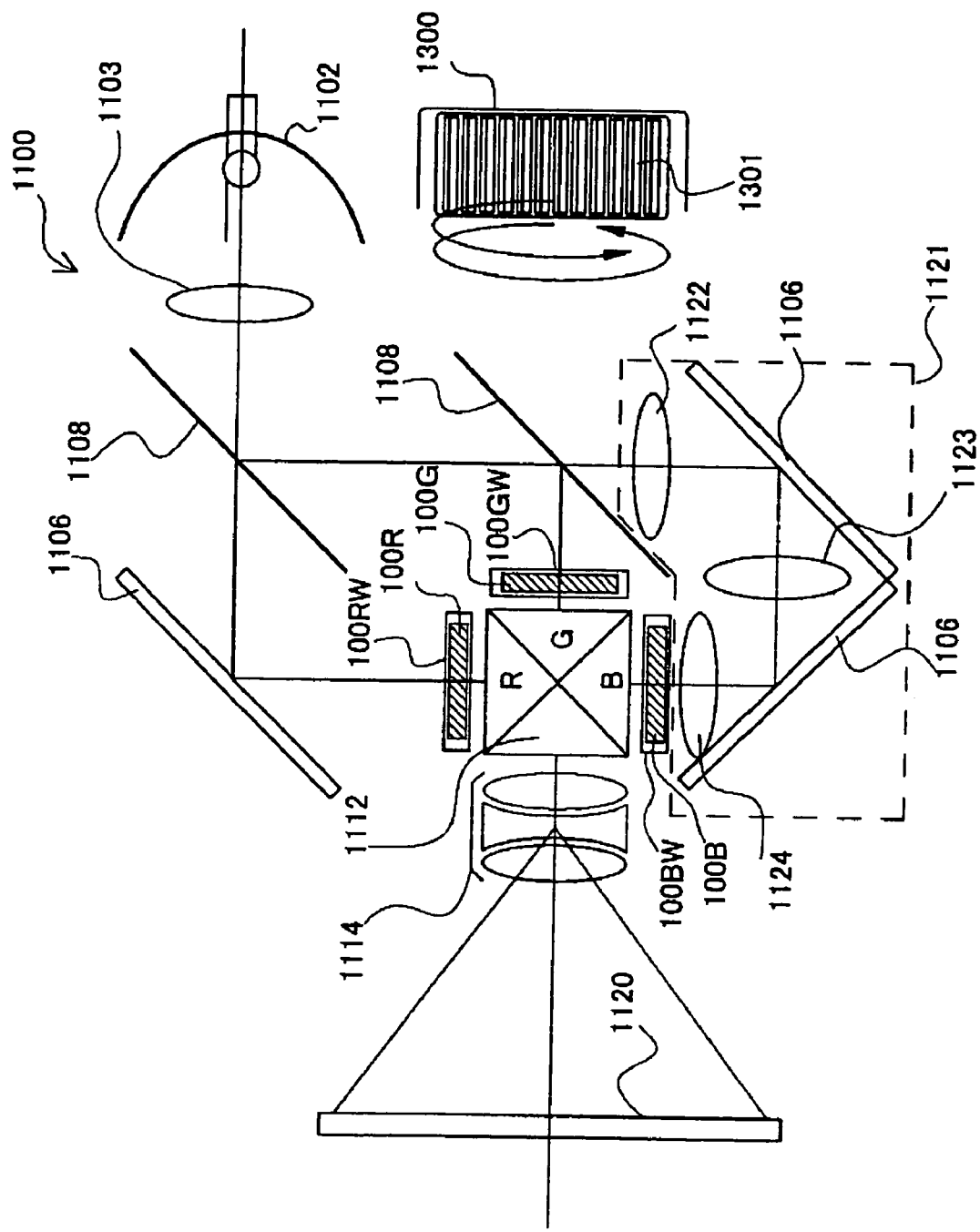
FIG. 1 is a plan view illustrating an exemplary embodiment of a projection liquid crystal apparatus according to the present invention.

In FIG. 1, a liquid crystal projector 1100, an example of the multi-plate color projector, is a projector which utilizes three liquid crystal light valves having electro-optical devices in which driving circuits are mounted on TFT array substrates as RGB light valves 100R, 100G, and 100B.

In the liquid crystal projector 1100, the light emitted from a lamp unit 1102, which is a white light source, such as a metal halide lamp, is divided into R, G, and B light components corresponding to three primary colors R, G, and B by three mirrors 1106 and two dichroic mirrors 1108, and the light components are guided into the light valves 100R, 100G, and 100B corresponding to the colors. In particular, the B light component is guided through a relay lens system 1121 including an incident lens 1122, a relay lens 1123, and an emitting lens 1124 in order to reduce or prevent the loss of light due to its long optical path. The light components corresponding to the three primary colors, which are modulated by the light valves 100R, 100G, and 100B, are synthesized by a dichroic prism 1112 and then projected on the screen 1120 as a color image through a projection lens 1114.

An active matrix driving liquid crystal apparatus, in which TFTs are used as switching devices, is used as the light valves 100R, 100G, and 100B of the exemplary embodiment. The light valves 100R, 100G, and 100B are composed of the electro-optical devices encased in the mounting cases as described later in detail.

As shown in FIG. 1, a fan 1300 (which corresponds to an example of "the cooling air discharging portion" as referred in an aspect of the present invention) is provided to the liquid projector 1100 to supply cooling air to the light valves 100R, 100G, and 100B. The fan 1300 includes a substantially cylindrical member having a plurality of blades 1301 in the side thereof, and the blades 1301 generate wind by rotating the cylindrical member with its axis as a center. The wind generated by the sirocco fan 1300 in accordance with such a principle flows in whirls as shown in FIG. 1.

The wind is supplied to the respective light valves 100R, 100G, and 100B through an air passage not shown in FIG. 1, and blows from respective outlets 100RW, 100GW, and 100BW provided near the light valves 100R, 100G, and 100B to the light valves 100R, 100G, and 100B.

If the fan 1300 as described above is used, it is possible to obtain an advantage that the wind is easily supplied to narrow spaces around the light valves 100R, 100G, and 100B because the wind has a high static pressure.

In the aforementioned construction, the light emitted from the lamp unit 1102, which is an intensive light source, raises the temperatures of the light valves 100R, 100G, and 10B. At that time, if the temperatures rises excessively, the liquid crystal constituting the light valves 100R, 100G, and 100B may be deteriorated, or hot spots generated by the partial heating of a portion of the liquid crystal panel due to the unevenness of light emitted from the light source cause the deviation of its transmittance. For this reason, particularly, in the exemplary embodiment, mounting cases capable of cooling the electro-optical devices are provided to the respective light valves 100R, 100G, and 100B as described later. Therefore, it is possible to effectively suppress the temperature rise of the light valves 100R, 100G, and 100B as described later.

In the exemplary embodiment, it is preferable that a cooling device including a circulating unit to circulate a coolant through the surrounding spaces of the light valves 100R, 100G, and 100B should be provided within a housing of the liquid crystal projector 1100. In this way, it is possible to further effectively cool the electro-optical device encased in the mounting case having a heat radiating function as described later.

An Exemplary Embodiment of an Electro-Optical Device

Figure 2:
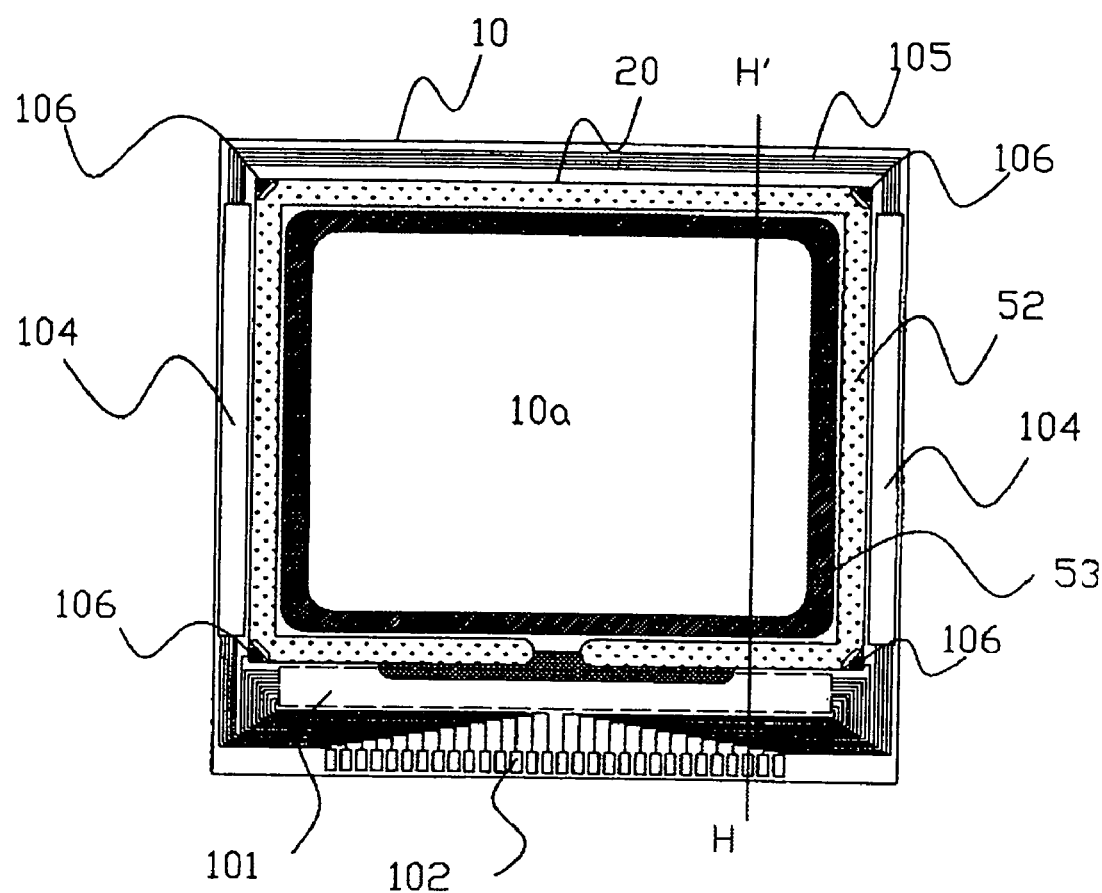
FIG. 2 is a plan view illustrating an exemplary embodiment of an electro-optical device according to the present invention.
Figure 3:
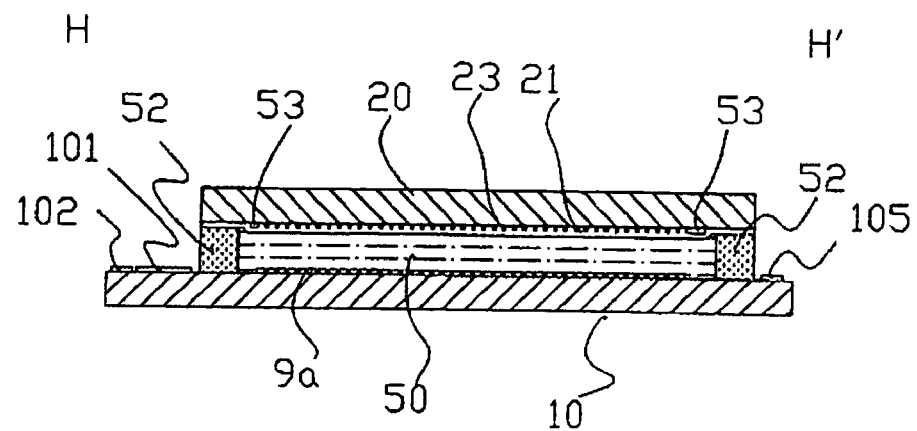
FIG. 3 is a cross-sectional view taken along the plane H–H' shown in FIG. 2.

Next, the overall construction of an electro-optical device according to an exemplary embodiment of the present invention will be described with reference to FIGS. 2 and 3. Herein, a driving circuit built-in TFT active matrix driving liquid crystal device is illustrated as an example of an electro-optical device. The electro-optical device according to the exemplary embodiment is used as liquid crystal light valves 100R, 100G, and 100B of the aforementioned liquid crystal projector 1100. Herein, FIG. 2 is a plan view of the electro-optical device and illustrates a TFT array substrate and constructional components provided thereon as shown from the counter substrate. FIG. 3 is a cross-sectional view taken along the plane H–H' shown in FIG. 2.

Referring to FIGS. 2 and 3, in the electro-optical device according to the exemplary embodiment, the TFT array substrate 10 is disposed to face the counter substrate 20. A liquid crystal layer 50 is interposed and sealed between the TFT array substrate 10 and the counter substrate 20. The TFT array substrate 10 and the counter substrate 20 are bonded to each other by a seal member 52 disposed at a seal region which is located around an image display region 10a.

The seal member 52 to bond both substrates is made of, for example, ultra-violet curable resin, thermosetting resin, and the like, which are applied on the TFT array substrate 10 and then cured by ultra-violet irradiation or heating in manufacturing processes. In addition, spacers made of a material, such as glass fiber or glass bead, are dispersed in the seal member 52 to keep the gap between the TFT array substrate 10 and the counter substrate 20 (the gap between the substrates) at a predetermined interval. Therefore, the electro-optical device of the exemplary embodiment is used for a light valve of the projector as a small-sized device and is suitable to enlarge and displaying images.

A frame light shielding film 53 to define a frame region of the image display region 10a is provided at the counter substrate 20 parallel to the inner side of the seal region where the seal member 52 is disposed. All or a portion of the frame light shielding film 53 may be provided at the TFT array substrate 10 as a built-in light shielding film.

In the peripheral region located at the outer side of the seal region, where the seal member 52 is disposed, of a region extending to the circumference of the image display region, a data line driving circuit 101 and an external circuit connection terminal 102 are provided along one side of the TFT array substrate 10, and scanning line driving circuits 104 are provided along two sides adjacent to the one side. Furthermore, a plurality of wiring lines 105 to connect the scanning line driving circuits 104 provided along two sides of the image display region 10a are provided at the remaining side of the TFT array substrate 10. As shown in FIG. 2, upper and lower conducting members 106 to serve as upper and lower conduction terminals between the two substrates are disposed at four corners of the counter substrate 20. On the other hand, on the TFT array substrate 10, the upper and lower conduction terminals are provided at the regions opposite to the corners. Through these members, the electrical conduction is made between the TFT array substrate 10 and the counter substrate 20.

In FIG. 3, pixel-switching TFTs and wiring lines, such as scanning lines and data lines are formed on the TFT array substrate 10, and then, alignment layers are formed on pixel electrodes 9a. On the other hand, on the counter substrate 20, a counter electrode 21 and a light shielding film 23 in a lattice or stripe shape are provided, and in addition, an alignment layer is formed on the uppermost portion thereof. A liquid crystal layer 50, which is made of, for example, one kind of nematic liquid crystal or a mixture of plural kinds of nematic liquid crystals, takes a predetermined alignment state between a pair of alignment layers.

In addition to the data line driving circuit 101 and the scanning line driving circuits 104, etc., a sampling circuit to sample image signals on image signal lines and to supply the sampled image signals to data lines, a precharge circuit to supply the precharge signals of a predetermined level to a plurality of data lines prior to the image signals, and an inspection circuit and the like to inspect the quality and defects of the electro-optical device during the manufacturing process or at the time of forwarding may be formed on the TFT array substrate 10 shown in FIGS. 2 and 3.

When the electro-optical device as constructed above is operated, intensive light is radiated from the upper side of FIG. 3. As a result, the temperature of the electro-optical device rises by the heating due to the light absorption in the counter substrate 20, the liquid crystal layer 50, and the TFT array substrate 10, etc. The rise in temperature facilitates the deterioration of the liquid crystal layers 50 and causes the deterioration of the quality of the display image.

Therefore, the rise in temperature can be effectively suppressed by an electro-optical device encased in the mounting case of the exemplary embodiment described below.

An Electro-Optical Device Encased in a Mounting Case; First Exemplary Embodiment Next, an electro-optical device encased in the mounting case according to a first exemplary embodiment of the present invention will be described with reference to FIGS. 4 to 14.

Figure 4:
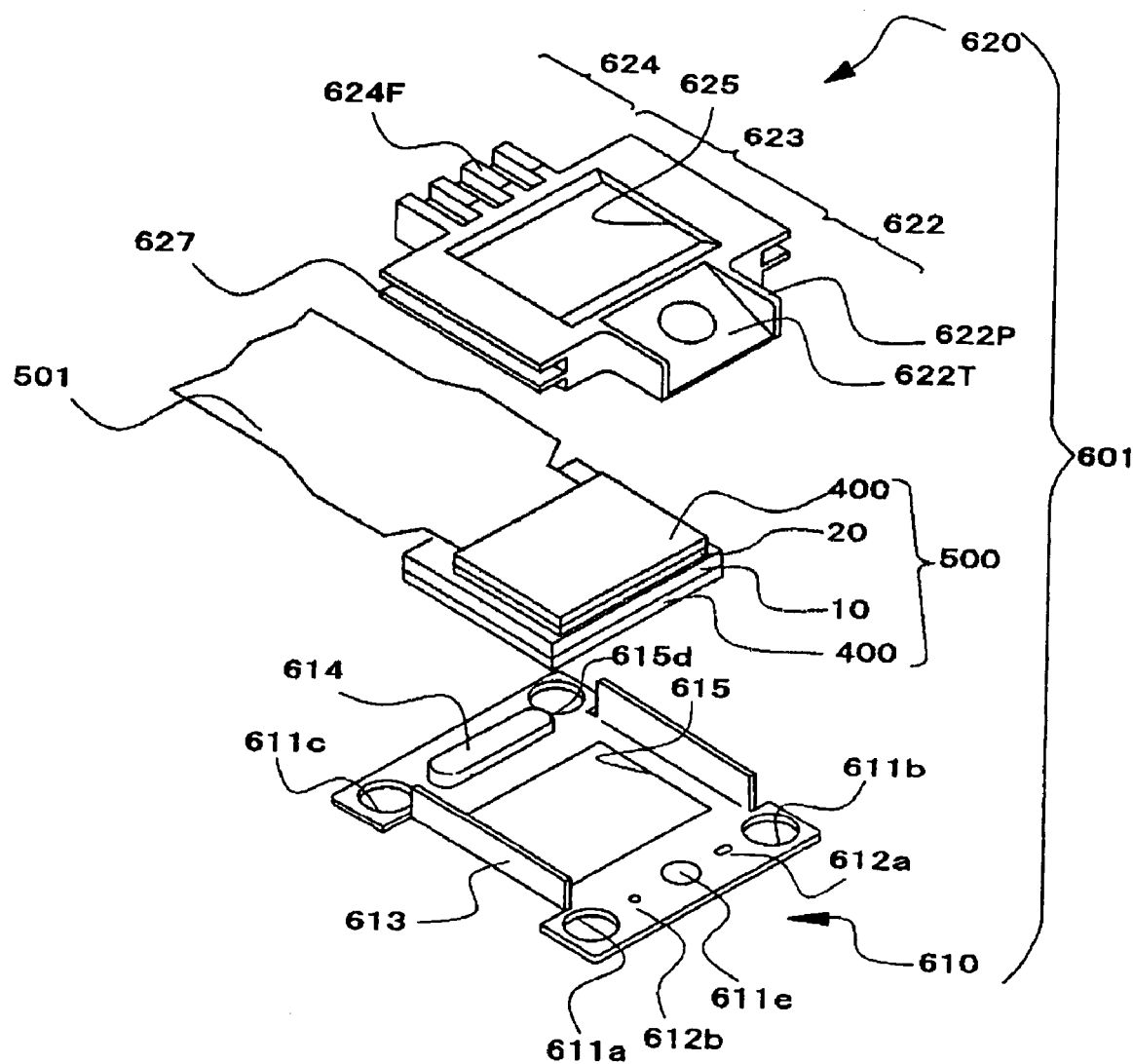
FIG. 4 is an exploded perspective view illustrating an electro-optical device together with a mounting case according to a first exemplary embodiment of the present invention.
Figure 5:
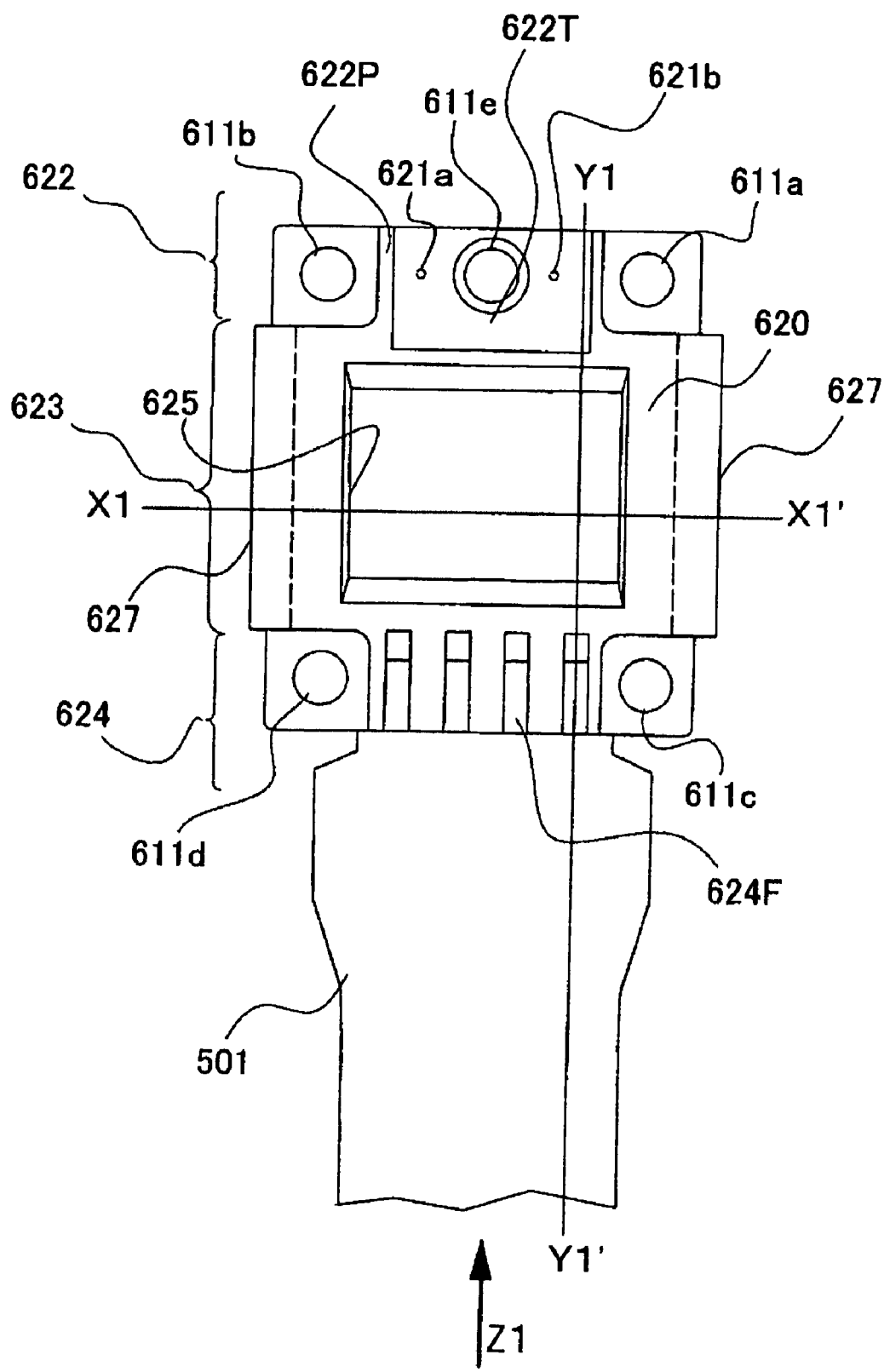
FIG. 5 is a front view of an electro-optical device encased in the mounting case according to the first exemplary embodiment of the present invention.
Figure 6:
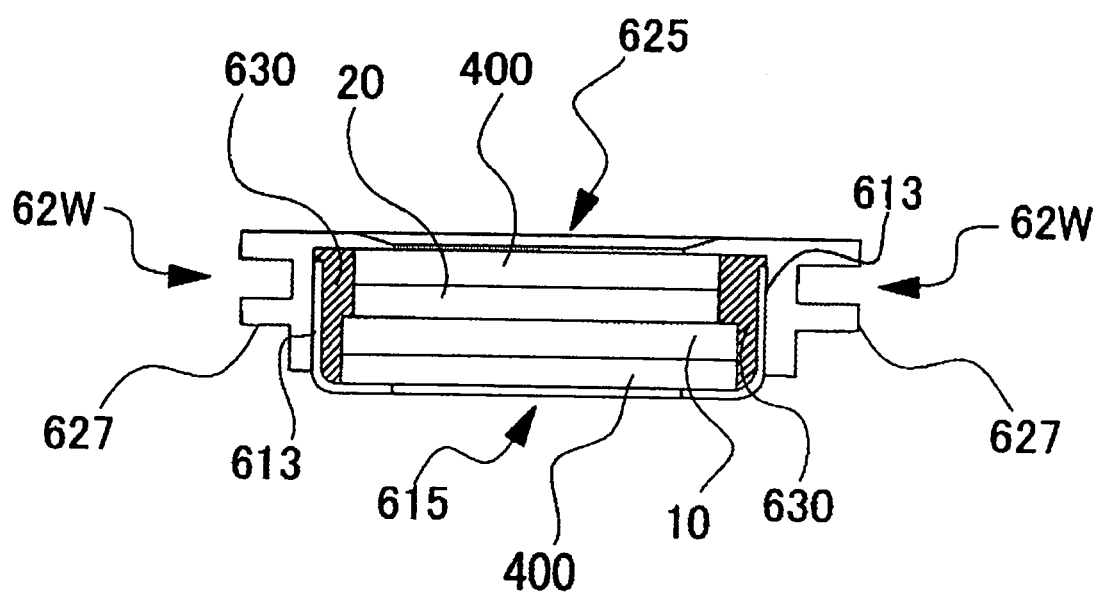
FIG. 6 is a cross-sectional view taken along the plane X1–X1' shown in FIG. 5.
Figure 7:
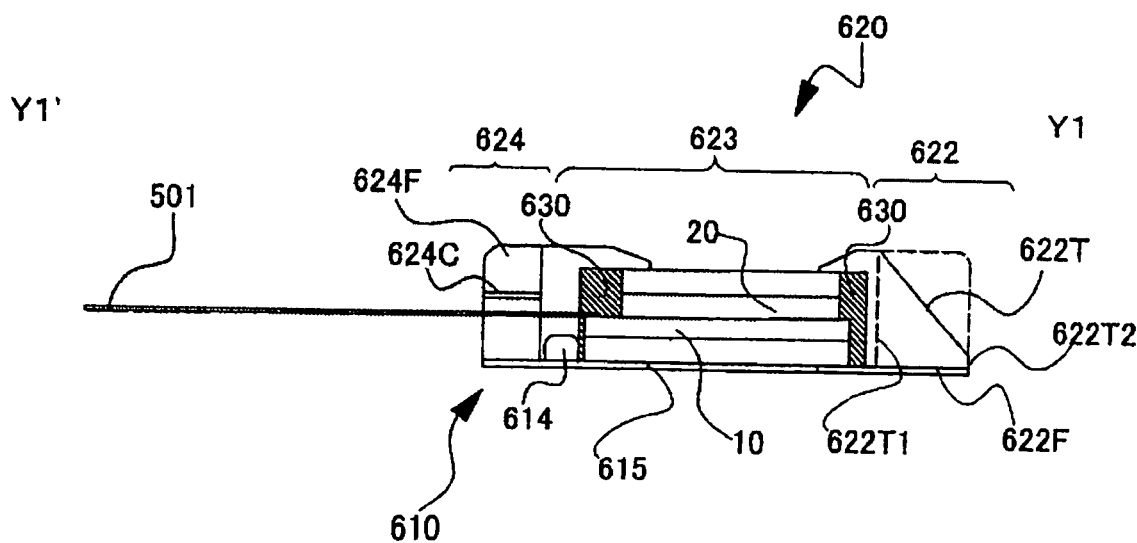
FIG. 7 is a cross-sectional view taken along the plane Y1–Y1' shown in FIG. 5.
Figure 8:
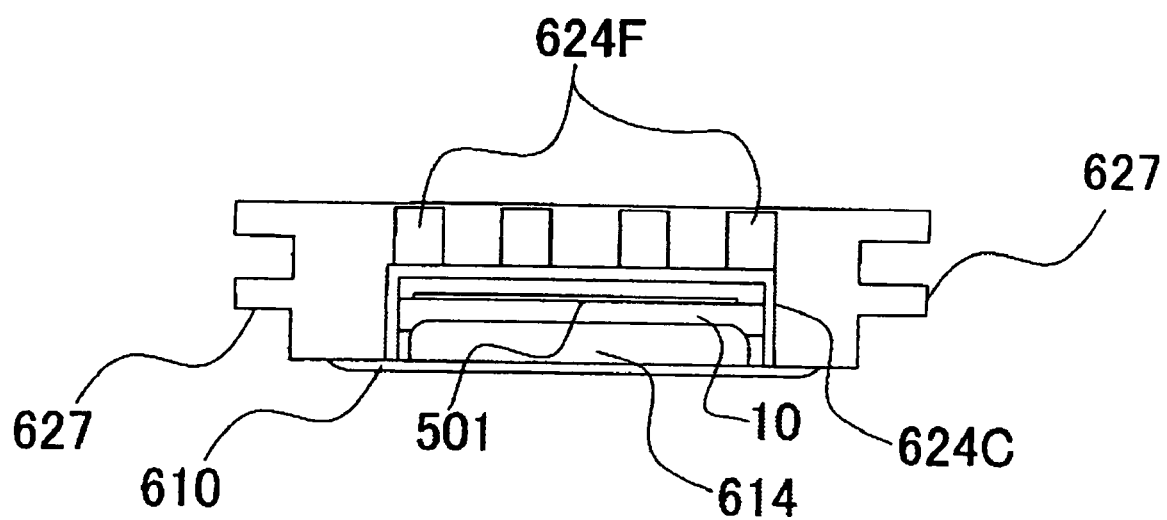
FIG. 8 is a back view shown from the direction of Z1 shown in FIG. 5.
Figure 9:
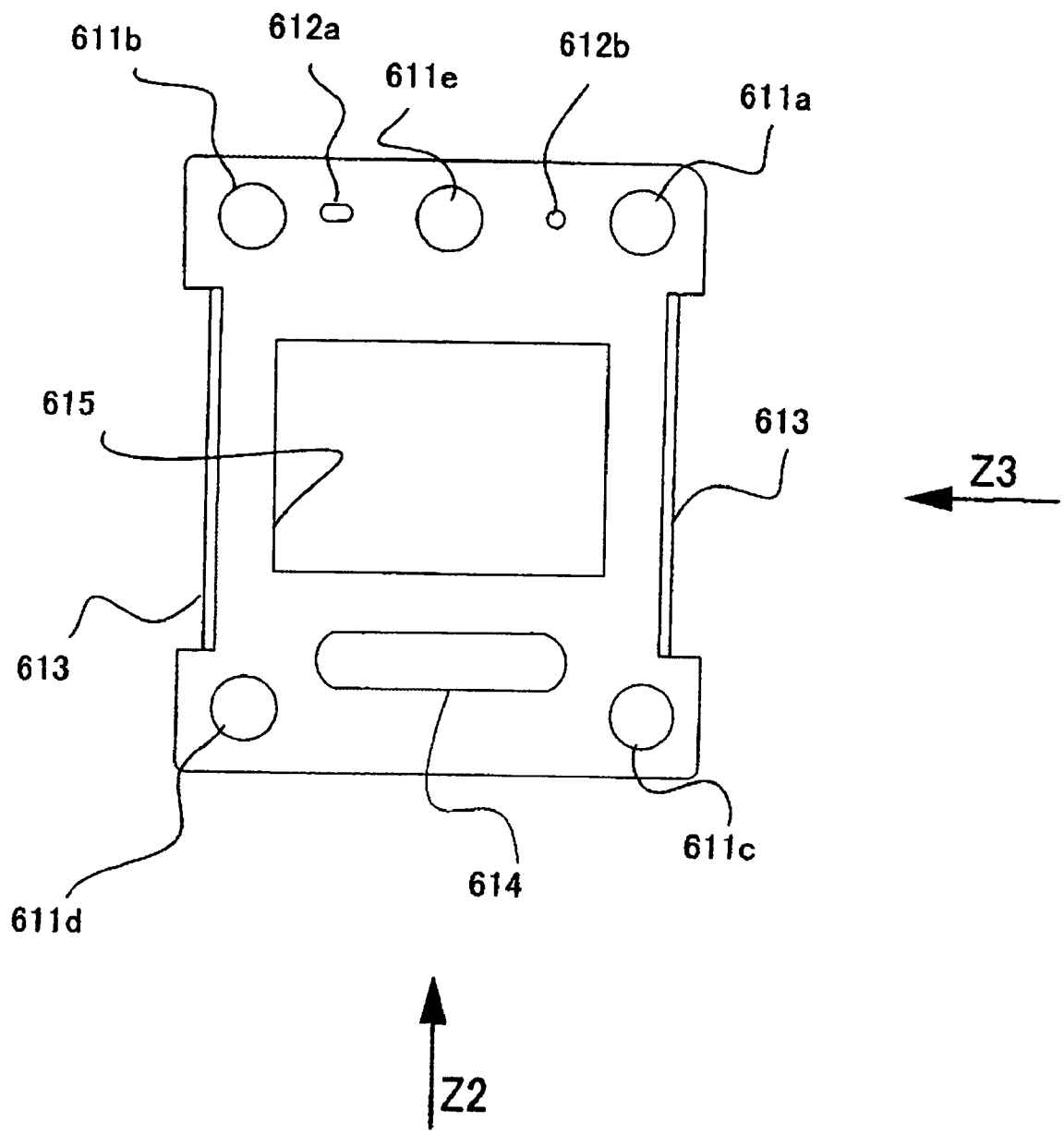
FIG. 9 is a front view of a plate member constituting the mounting case according to the first exemplary embodiment of the present invention.
Figure 10:
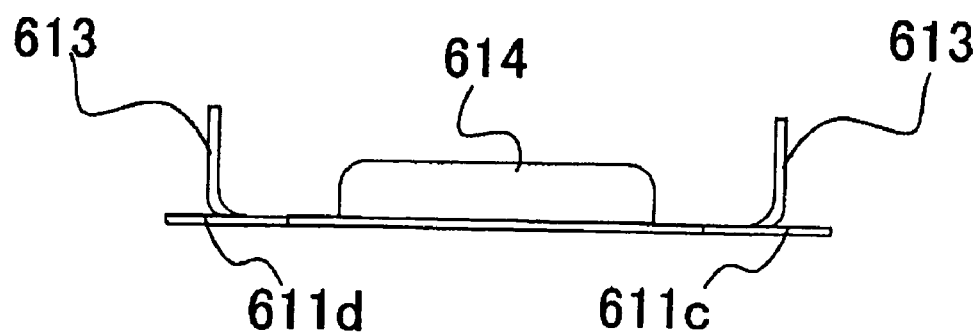
FIG. 10 is a back view shown from the direction of Z2 shown in FIG. 9.
Figure 11:
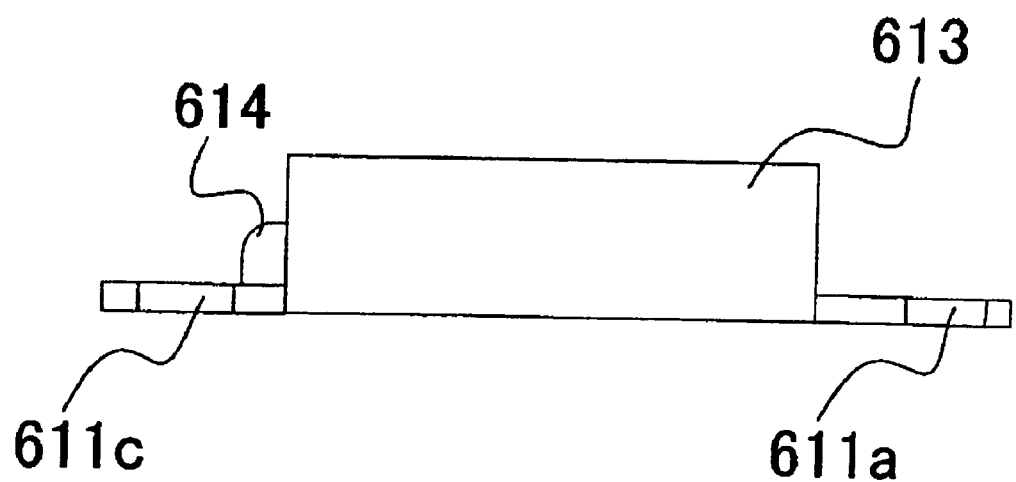
FIG. 11 is a side view shown from the direction of Z3 shown in FIG. 9.
Figure 12:
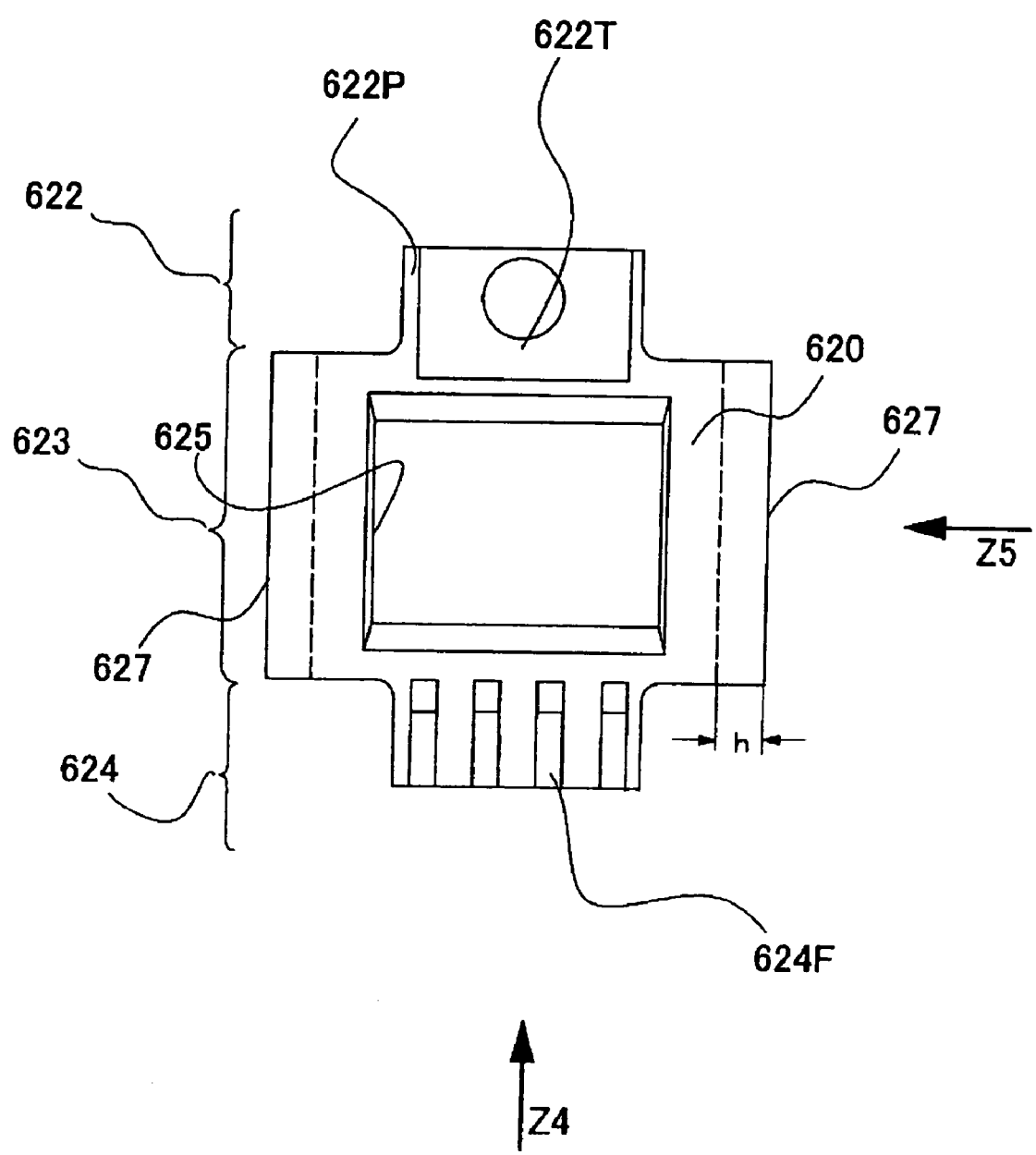
FIG. 12 is a front view of a cover member constituting the mounting case according to the first exemplary embodiment of the present invention.
Figure 13:
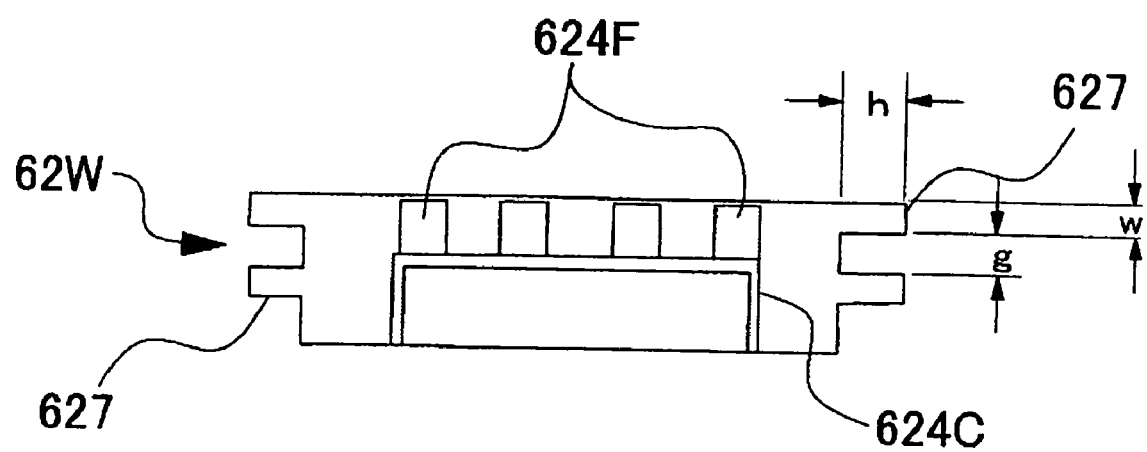
FIG. 13 is a back view shown from the direction of Z4 shown in FIG. 12.
Figure 14:
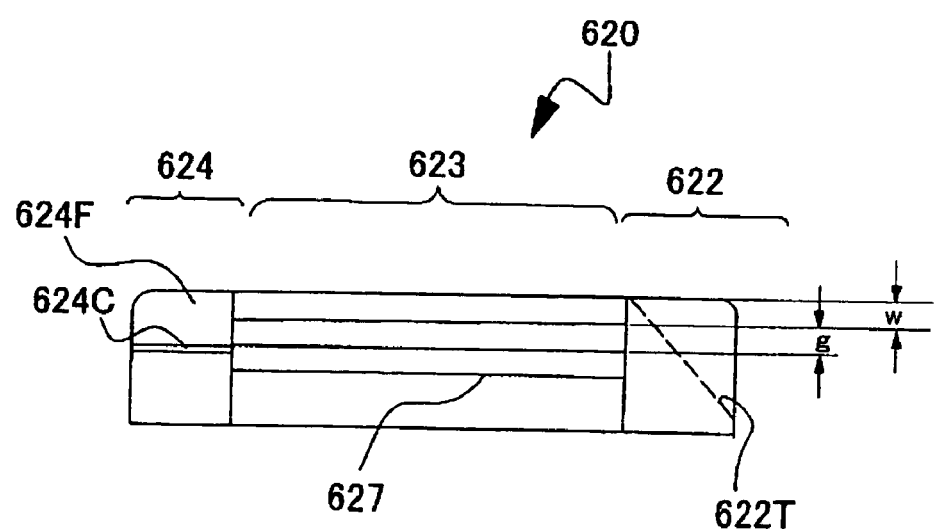
FIG. 14 is a side view shown from the direction of Z5 shown in FIG. 12.

Firstly, the basic construction of a mounting case will be described with reference to FIGS. 4 to 14. Herein, FIG. 4 is an exploded perspective view illustrating an electro-optical device together with a mounting case according to the first exemplary embodiment, FIG. 5 is a front view of the electro-optical device encased in the mounting case. FIG. 6 is a cross-sectional view taken along the plane X1–X1' shown in FIG. 5. FIG. 7 is a cross-sectional view taken along the plane Y1–Y1' shown in FIG. 5. FIG. 8 is a back view shown from the direction of Z1 shown in FIG. 5. FIGS. 4 to 8 illustrate the mounting case in which electro-optical devices are accommodated. In addition, FIG. 9 is a front view of a plate member constituting the mounting case. FIG. 10 is a back view shown from the direction of Z2 shown in FIG. 9. FIG. 11 is a side view shown from the direction of Z3 shown in FIG. 9. Furthermore, FIG. 12 is a front view of a cover member constituting the mounting case. FIG. 13 is a back view shown from the direction of Z4 shown in FIG. 12. FIG. 14 is a side view shown from the direction of Z5 shown in FIG. 12.

As shown in FIGS. 4 to 8, the mounting case 601 includes the plate member 610 and the cover member 620. The electro-optical device 500, which is accommodated in the mounting case 601, includes another optical component, such as a reflection preventing plate overlapped with the surface thereof, and an external circuit connecting terminal, to which a flexible connector 501 is connected, in addition to the electro-optical devices shown in FIGS. 2 and 3. Furthermore, a polarizing plate or a phase difference plate may be provided to the optical system of the liquid crystal projector 1100, or it may be overlapped with the surface of the electro-optical device 500.

Moreover, a dustproof substrate 400 is provided to portions not facing the liquid crystal layers 50 in the TFT array substrate 10 and the counter substrate 20 (see FIGS. 4, 6, and 7).

The dustproof substrate 400 is constructed to have a predetermined thickness. The dustproof substrate reduces or prevents dirt or dust around the electro-optical device 500 from being directly stuck onto the surface of the electro-optical device. Therefore, it is possible to effectively remove a defect that a figure of dirt or dust appears on the magnified projection image. Since the dustproof substrate 400 has the predetermined thickness, the dustproof substrate has a defocusing function to deviate the focus of the source light or the vicinity thereof from a location where dirt or dust exists, that is, from the surface of the dustproof substrate 400.

As shown in FIG. 4, the electro-optical device 500 including the TFT array substrate 10, the counter substrate 20, and the dustproof substrate 400 is accommodated in the mounting case 601 including the plate member 610 and the cover member 620. However, as shown in FIGS. 6 and 7, a molding member 630 is filled between the electro-optical device 500 and the mounting case 601. The molding member 630 ensures the bonding between the electro-optical device 500 and the mounting case 601 and reduces or prevents the occurrence of positional deviation of the former within the latter.

In the first exemplary embodiment, it is assumed that the light is incident on the cover member 620, passes through the electro-optical device 500, and emits from the plate member 610. That is, referring to the FIG. 1, the component facing the dichroic prism 1112 is not the cover member 620 but the plate member 610.

Now, the construction of the plate member 610 and the cover member 620 constituting the plate member 610 will be described in more detail.

First, as shown in FIGS. 4 to 11, the plate member 610 is a member having a substantially quadrilateral shape in plan view and is disposed to face one surface of the electro-optical device 500. In the first exemplary embodiment, the plate member 610 and the electro-optical device 500 are directly abutted against each other, and the latter is mounted on the former.

More specifically, the plate member 610 includes a window 615, a strength reinforcement portion 614, a bent portion 613, a cover member fixing hole portion 612, and attaching holes 611a to 611d and 611e.

The window 615 is formed in an opened shape in which a portion of the member having the substantially quadrilateral shape is opened. For example, the window 615 is a member to enable the light to transmit from the upper side to the lower side in FIG. 6. The light can pass through the electro-optical device 500 by the window 615. When the electro-optical device 500 is mounted on the plate member 610, the peripheral region around the image display region 10a in the electro-optical device 500 is in an abutting state against the edge of the window 615. In this manner, the plate member 610 holds the electro-optical device 500.

The strength reinforcement portion 614 has a three-dimensional shape formed by a process of convexing a portion of the member having the substantially quadrilateral shape higher than other portions in plan view. In this way, the strength of the plate member 610 is reinforced. The strength reinforcement portion 614 may be disposed at a location to substantially abut against one side of the electro-optical device 500 (see FIG. 7). However, strictly speaking, both of them do not abut against each other in FIG. 7.

The bent portion 613 is a portion formed by bending a portion of each of two opposite sides of the member having the substantially quadrilateral shape toward the inside of the quadrilateral shape. The outer surface of the bent portion 613 is abutted against the inner surface of the cover member 620 when bonding the plate member 610 to the cover member 620 (see FIG. 6). The inner surface of the bent portion 613 is abutted against the outer surface of the electro-optical device 500 through the molding member 630 (see FIG. 6). In this manner, the location of the electro-optical device 500 on the plate member 610 is roughly determined.

In addition, since the inner surface of the bent portion 613 abuts against the outer surface of the electro-optical device 500 through the molding member 630, the absorption of heat from the former to the latter is available. In other words, the plate member 610 can function as a heat sink for the electro-optical device 500. Thus, it is possible to reduce or prevent the accumulation of heat in the electro-optical device 500 due to the intensive light radiation from the lamp unit 1102 to the electro-optical device 500.

In addition, since the outer surface of the bent portion 613 abuts against the inner surface of the cover member 620 as described above, the heat transfer from the former to the latter is available. The heat radiation from the electro-optical device 500 is performed by the amount corresponding to heat capacitances of both of the plate member 610 and the cover member 620, so that the cooling of the electro-optical device 500 can be very effectively performed.

The cover member fixing hole portion 612 is a hole portion to engage with a convex portion 621 provided at the corresponding location in the cover member 620. The plate member 610 and the cover member 620 are fixed to each other by engaging the cover member fixing hole portion 612 with the convex portion 621. In addition, in the first exemplary embodiment, the cover member fixing hole portion 612 includes two holes as shown in each figure. In case of the need of distinguishing the holes, the two holes are referred to as cover member fixing holes 612a and 612b, respectively. Corresponding to the holes, the convex portion 621 also includes two convex portions. In case of the need of distinguishing the convex portions, the two convex portions are referred to as convex portions 621a and 621b, respectively.

The attaching holes 611a to 611d are used to attach the electro-optical device encased in the mounting case within the liquid crystal projector 1100 as shown in FIG. 1. In the first exemplary embodiment, the attaching holes 611a to 611d are provided to four corners of the member having the substantially quadrilateral shape. In addition to the attaching holes 611a to 611d, an attaching hole 611e is provided in the first exemplary embodiment. The attaching hole 611e is disposed to form a triangle together with the attaching holes 611c and 611d of the attaching holes 611a to 611d. In other words, the attaching holes 611e, 611c, and 611d are disposed as "the corresponding apexes" of the triangle. In this manner, in the first exemplary embodiment, it is possible to fix the four points at the four corners using the attaching holes 611a to 611d and to fix the three points at the three corners using the attaching holes 611e, 611c, and 611d.

Next, the cover member 620, which is a member having a substantially cubical shape, is disposed to face the other surface of the electro-optical device 500, as shown in FIGS. 4 to 8 and 12 to 14.

The cover member 620 is preferably made of light shielding resin, metallic material, and the like in order to reduce or prevent the leakage of the light in the peripheral region of the electro-optical device 500 and the introduction of the stray light from the peripheral region to the image display region 10a. Since it is preferable that the cover member 620 should function as a heat sink for the plate member 610 or the electro-optical device 500, the cover member 620 is preferably made of materials of relatively high heat conductivity, such as aluminum, magnesium, copper, or an alloy thereof.

Specifically, the cover member 620 includes the convex portion 621, a cooling air introducing portion 622, a cooling air discharging portion 624, and a cover main body 623. The convex portion 621 is used to fix the plate member 610, and includes two convex portions 621a and 621b at the locations corresponding to the cover member fixing holes 612a and 612b, respectively. The convex portion 621 according to the first exemplary embodiment is provided to form a portion of the cooling air introducing portion 622 or a tapered portion 622T described later. In FIG. 5, although the original convex portion 621 is not shown, it is particularly shown in FIG. 5.

The cooling air introducing portion 622 includes the tapered portion 622T and a baffle plate 622P as shown in FIGS. 4, 5, 7, 12, or 14. In the first exemplary embodiment, the tapered portion 622T has an external shape of a substantially triangular prism with its bottom being a right triangle. In addition, the tapered portion 622T has an appearance where one side of the triangular prism in the tapered portion 622T is attached on the one side of the cover main body 623. In this case, the one side of the triangular prism includes a side interposed between a rectangular portion of the bottom of the triangular prism and a corner portion adjacent thereto. Therefore, the tapered portion 622T has a shape including a base portion 622T1 at the highest height of the side plane of the cover main body 623 and a tip 622T2 at the height gradually lowered therefrom. Herein, the term "height" is a distance in the top-bottom direction in FIG. 7. In FIG. 7, a dotted line extending in the top-bottom direction is represented as a reference. On the other hand, the baffle plate 622P has a shape of a wall erected along one side between two angles except for the rectangular portion on the bottom of the triangular prism. In terms of the aforementioned "height", the height of the baffle plate 622P is constant at any place between the base portion 622T1 and the tip 622T2 although the height of the tapered portion 622T is gradually lowered from the base portion 622T1 to the tip 622T2.

The cooling air discharging portion 624 includes a flexible connector leading portion 624C and a rear fin portion 624F as shown in FIG. 4, 5, 8, 12, or 13. The flexible connector leading portion 624C is provided on one side of the cooling air discharging portion to face the side plane of the cover main body 623 on which the tapered portion 622T is provided. Specifically, a member having a cross-sectional shape of "U" on the aforementioned side plane is attached by an opened portion having a cross-sectional shape of "U" in the downward direction of FIG. 8 or 13 as shown in FIG. 8 or 13. A flexible connector 510 connected to the electro-optical device 500 is drawn out from the space surrounded in a shape of "U".

On the other hand, the rear fin portion 624F is provided on the so-called ceiling plate having a cross-sectional shape of "U" in the flexible connector leading portion 624C. More specifically, the rear fin portion 624F has a shape of a plurality ("four" in FIG. 4, etc.) of portions straightly protruding from the ceiling plate in parallel to match the numerals in a direction of a straightly protruding portions, that is, the side fin portions 627 to be described later, as shown in FIG. 4, 5, 8, 12, or 13. By doing so, the surface area of the cover member 620 increases.

Finally, the cover main body 623, which is a member having a substantially rectangular parallelepiped shape, is interposed between the cooling air introducing portion 622 and the cooling air discharging portion 624, as shown in FIGS. 4 to 8 and FIGS. 12 to 14. The inside of the rectangular parallelepiped shape, which accommodates the electro-optical device 500, is in the so-called hollow state. Strictly speaking, the cover main body 623 is a member having a lid-free box shape. The "cover" in this expression may be considered to correspond to the plate member 610 described above.

More specifically, the cover main body 623 has a window 625 and a side fin portion 627. The window 625 of which a bottom plane having the box shape and a "top surface" in FIG. 4 or 6 are formed in an opening shape is a member capable of allowing light to penetrate from the upper part to the lower part in FIG. 6. The light emitted from the lamp unit 1102 within the liquid crystal projector 1100 shown in FIG. 1 can be incident to the electro-optical device 500 through the window 625. In addition, in the cover main body 623 having the window 625, the peripheral region near the image display region 10a in the electro-optical device 500 may be preferably formed to abut against the edge of the window 625 similarly to the description of the window 615 in the plate member 610. By doing so, the cover main body 623, more particularly, the edge of the window 625 can also hold the electro-optical device 500.

In the first exemplary embodiment, in particular, the side fin portions 627, which is an example of "the surface area increasing portion" or "fin" in an aspect of the present invention, are provided to both sides of the cover main body 623. The term "both sides" is the side planes except for the sides where the aforementioned cooling air introducing portion 622 and the cooling air discharging portion 624 are provided. Both sides (hereinafter, sometimes referred to as a "sidewall portion 62W"), for example, face one side of the electro-optical device 500 and the other side facing the one side, respectively, as shown in FIG. 6, etc. In addition, the inner surface of the sidewall portion 62W is abutted against the outer surface of the bent portion 613 in the plate member 610 at the process of adhering the cover member 620 and the plate member 610 (see FIG. 6). In this way, the sidewall portion 62W according to the first exemplary embodiment may face the one side and the other side of the electro-optical device 500, in particular, through the bent portion 613. The term "to face" referred in an aspect of the present invention corresponds to this case.

More specifically, the side fin portion 627 has a shape of a plurality of portions straightly protruding from the side plane in parallel from the cooling air introducing portion 622 to the cooling air discharging portion 624 as shown in FIG. 4 or FIGS. 6 and 13. In the first exemplary embodiment, in particular, two columns of straight fins are disposed in parallel.

The distance g between the two columns of fins is 1 mm or more (see FIGS. 13 and 14). In the size of the two columns of fins, the height h and the width w are 0.5 mm or more and 0.3 mm or more, respectively (see FIGS. 12 and 13).

The presence of the side fin portion 627 leads to the increase of the surface area of cover main body 623 or the cover member 620. In particular, in the first exemplary embodiment, since the side fin portion 627 is formed with sidewall portion 62W having a relatively large ratio of occupation over the entire cover member 620, the increase of the surface area is effectively obtained. Furthermore, the increase of the surface area is surely obtained by setting the height h and the width w of the two columns of fins to the aforementioned values.

The side fin portion 627 having the aforementioned shape may be formed by a process such as, for example, a cutting process, a forging process, a pressing process, an injection molding process, or a casting process, at the same time of or after the process of forming the cover member 620. According to these processes, it is possible to easily form the side fin portion 627.

Figure 15:
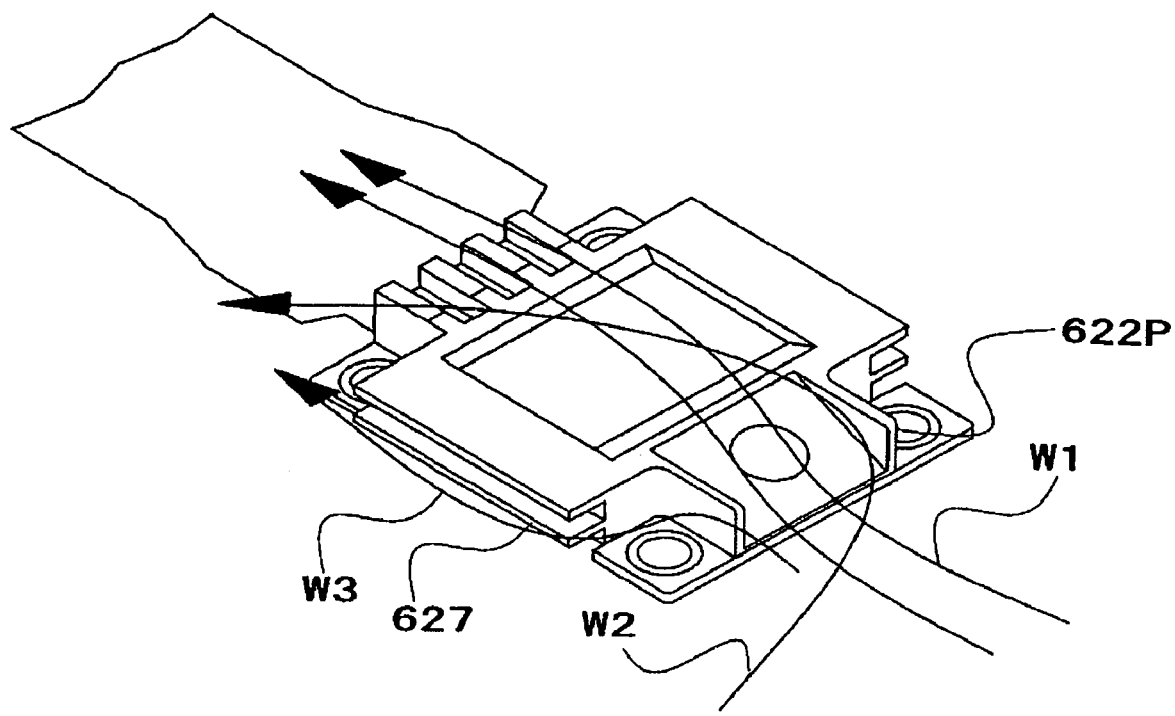
FIG. 15 is a perspective view of the electro-optical device encased in the mounting case according to the first exemplary embodiment of the present invention and illustrates the flow of air into the electro-optical device encased in the mounting case.

Since the cover member 620 has the aforementioned construction, the wind blown from the fan 1300 provided in the liquid crystal projector 1100, as shown in FIG. 1, flows as shown in FIG. 15 near the mounting case 601 or the cover member 620. Here, FIG. 15 is a perspective view of an electro-optical device encased in the mounting case and illustrates the typical flow of wind into the electro-optical device encased in the mounting case. In addition, in order to implement the same flow of the cooling air in the liquid crystal projector 1100 shown in FIG. 1 as that of FIG. 15, it is necessary to provide the electro-optical device encased in the mounting case, that is, light valves 100R, 100G, and 100B so that the outlets 100RW, 100GW, and 100BW described above with reference to FIG. 1 can face the cooling air introducing portion 622 constituting the cover member 620.

Firstly, as the cooling air flows up the tapered portion 622T of the cooling air introducing portion 622, the cooling air is blown to the cover main body 623 by which the surface of the electro-optical device 500 is exposed (see a reference numeral W1). In addition, since the baffle plate 622P is provided to the cooling air introducing portion 622, most of the cooling air blown in any direction can be guided on the tapered portion 622T, and moreover, into the cover main body 623 (see a reference numeral W2). In this way, according to the first exemplary embodiment, since the wind can be effectively blown out toward the cover main body 623, the heat generated from the electro-optical device 500 can be directly dissipated. In other words, in addition to the cooling function, the heat accumulated in the cover member 620 can be effectively dissipated.

The wind which is in the outer side of the baffle plate 622P of the cooling air introducing portion 622, that is, in the side of not facing the tapered portion 622T (see a reference numeral W3) or the wind which reaches the surface of the electro-optical device 500 or the vicinity thereof as described above and then flows by the side of the cover main body 623 reaches the side fin portion 627. As described above, since the side fin portion 627 has the straight fins and the surface area of the cover main body 623 is increased, it is possible to effectively cool the cover main body 623 or the cover member 620. In addition, in the first exemplary embodiment, since the surface area is surely increased by the formation of the side fin portion 627 on the sidewall portion 62W or the suitable setting of the height h and the width W of the two column of fins constituting the side fin portion 627 as described above, it is possible to very effectively cool the cover member 620.

In addition, as described above, the wind which reaches the surface of the electro-optical device 500 or the vicinity thereof and then, as it is, blows away from the end portion of the cover main body 623 reaches the rear fin portion 624F (see a reference numeral W1). Since the rear fin portion 624F has the straight protruding portion and the surface area of the cooling air discharging portion 624 is increased as described above, it is possible to effectively cool the cooling air discharging portion 624 and the cover member 620.

In this way, in the mounting case 601 according to the first exemplary embodiment, it is possible to effectively perform the cooling by the cooing air as a whole. In addition, such a cooling method is very effective in finally dissipating externally the heat transferred by the electro-optical device 500, the plate member 610, and the cover member 620 in this order, as described above. Since the cover member 620 can be effectively cooled, the flow of heat transferred from electro-optical device 500 through the bent portion 613 to plate member 610 or the cover member 620 can be effectively maintained at any time. For example, since the cover member 620 is suitably cooled in a normal state, its function as a heat sink can be maintained at any time, and thus, the heat dissipation from the plate member 610, and moreover, from the electro-optical device 500 can be effectively performed at any time as seen from the cover member 620. In addition to this, if the cover member 620 in the first exemplary embodiment is made up of a material having relatively high heat conductivity, such as aluminum, magnesium, copper, or alloys thereof as described above, the aforementioned function and effect will be more effectively enhanced.

Therefore, in the first exemplary embodiment, since the excessive heat is not accumulated in the electro-optical device 500, the deterioration of the liquid crystal layers 50 and the occurrence of the hot spots can be reduced or prevented in advance, so that the deterioration of images can be greatly reduced.

In addition, in the first exemplary embodiment, since there are a variety of features as follows with respect to the side fin portion 627 or the relation between the side fin portion 627 and the flow of cooling air, it is possible to greatly obtain cooling effects of the aforementioned electro-optical device 500.

Firstly, although the side fin portion 627 has two columns of straight fins in parallel as described above, it can be understood that the straight fins are provided to correspond with the flow of the cooling air (particularly, see the cooling air indicated with the reference numeral W3) as shown in FIG. 15. By doing so, the cooling effect on the cover member 620 by the side fin portion 627 can be effectively obtained. This is a result of the flow of the cooling air not being excessively interrupted by the side fin portion 627 and the cooling air can be smoothly guided into the rear end portion.

In addition, as noticeable from the cooing air W2 in FIG. 15, it is natural that there is a case that the cooling air flows in a direction which does not necessarily correspond with the extending direction of the straight fins. Moreover, in the exemplary embodiment, the fan 1300, an example of the cooling air discharging portion provided to the liquid crystal projector 1100, supplies a whirlpool wind as already described above (see FIG. 1). Therefore, strictly speaking, the direction of the cooling air is not always limited to the straight direction toward the electro-optical device encased in the mounting case which is the light valve 100R, 100G, or 100B.

However, even in consideration of these situations, the side fin portion 627 according to the first exemplary embodiment belongs to the case that it is provided "to correspond with the flow of the cooling air" referred in an aspect of the present invention. This is because, even in the aforementioned situation, most of the cooling air shown in FIG. 15 flows into the cooling air introducing portion 622, the cover main body 623, and cooling air discharging portion 624 in this order.

In this way, the construction that "the fins are provided to correspond with the flow of the cooling air" does not mean only the case where the fins are provided to strictly or completely correspond with the flow of the cooling air. As described above, it also includes the case where the fins are provided to roughly correspond with the direction of the flow of the cooling air based on the electro-optical device encased in the mounting case.

Secondly, the two columns of straight fins constituting the side fin portion 627 according to the first exemplary embodiment are disposed with the interval of 1 mm or more between them as described above. By doing so, even in a case where the static pressure and the amount of the cooling air W3 shown in FIG. 15 are low, the cooling air W3 can be blown between the two columns of straight fins uniformly and smoothly.

In particular, in the first exemplary embodiment, the electro-optical device encased in the mounting case is provided as the light valves 100R, 110G, and 100B of the liquid crystal projector 1100 as shown in FIG. 1. Therefore, the other components, such as the incident lens 1122 and the relay lens 1123, need to be provided, so that the electro-optical device encased in the mounting case, that is, the light valves 100R, 100G, and 10B, and the fan 1300 have to be disposed at a relatively long distance. And thus, in some cases, it is difficult to dispose both of them to be completely opposite to each other. In this case, it is considered that only the cooling air having a low static pressure and a low amount are blown to the electro-optical device encased in the mounting case.

Nevertheless, in the first exemplary embodiment, since the distance between the two columns of fins is set at a relatively long distance of 1 mm or more, the cooling air having the low static pressure and low amount can be blown even between the two columns of fins. By doing so, since the surface area of the fins, which are exposed to the cooling air, increases, the heat radiating characteristic of the fins can be enhanced. Therefore, according to the first exemplary embodiment, it is possible to further enhance the capability of the heat dissipation of the overall cover member 620.

Figure 16:
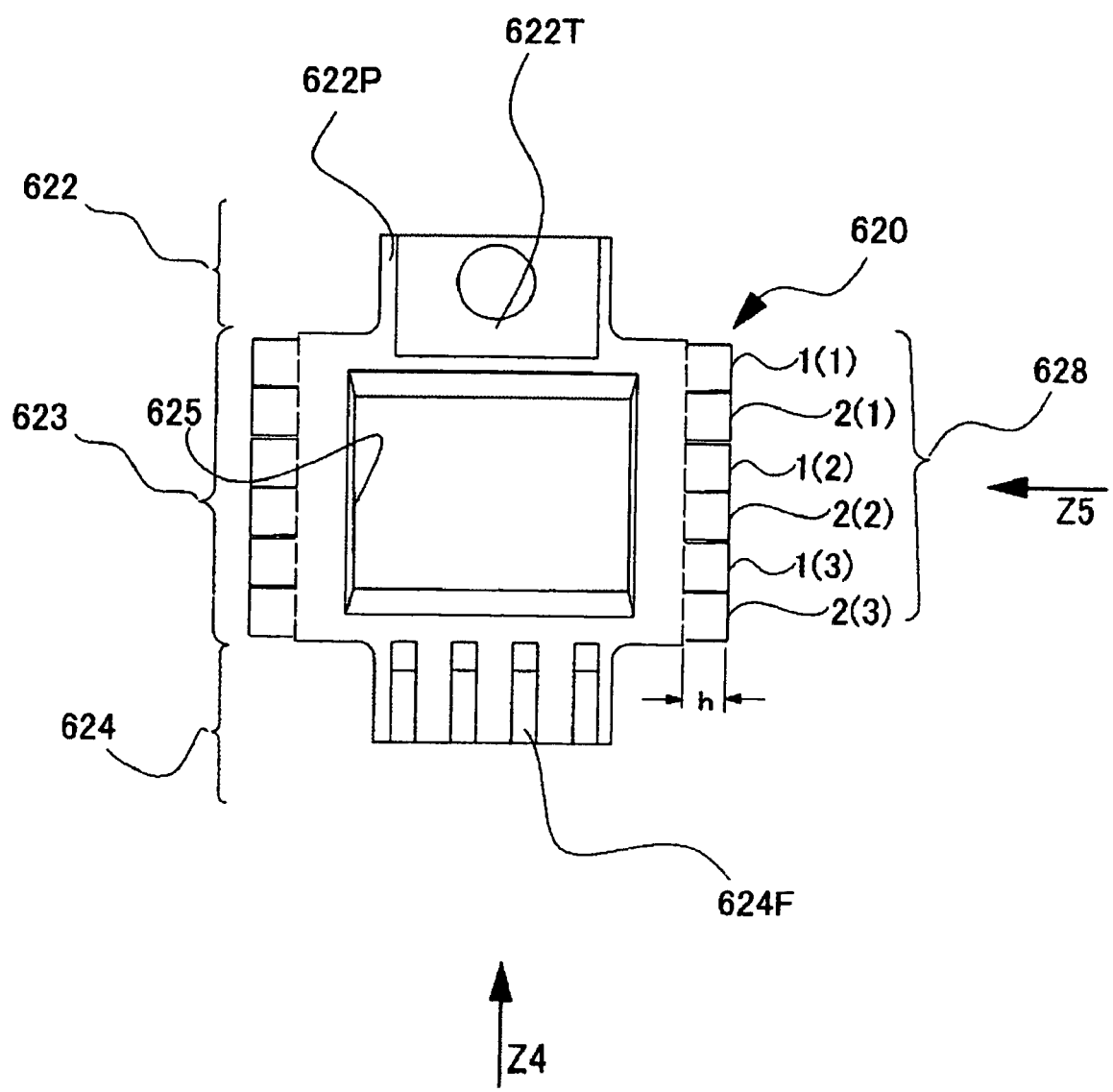
FIG. 16 is a view having the same purpose as FIG. 12 and is a front view in which the shapes of fins are different from those of the fins shown in FIG. 12.

An Electro-Optical Device Encased in a Mounting Case; Second Exemplary Embodiment Next, an electro-optical device encased in the mounting case according to a second exemplary embodiment of the present invention will be described with reference to FIGS. 16 to 18. FIGS. 16 and 18, which are views having the same purpose as FIGS. 12 to 14, illustrate cases having different shapes of side fin portions from the figures. In addition, in the second exemplary embodiment, the constructions and effects of the main components of the aforementioned "projection display apparatus", "electro-optical device", and the "electro-optical device encased in the mounting case" are the same as those of the first exemplary embodiment. Therefore, their descriptions will be omitted, and only the characteristic parts in the second exemplary embodiment will be described.

Figure 17:
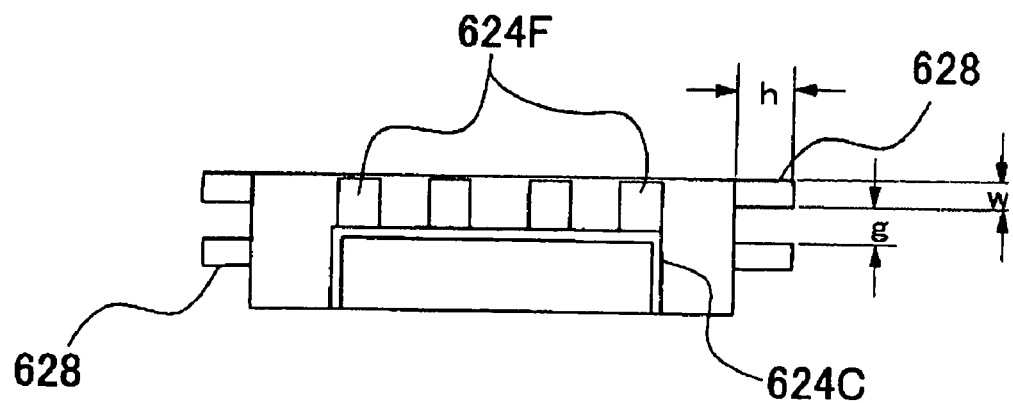
FIG. 17 is a back view shown from the direction of Z4 shown in FIG. 16.
Figure 18:
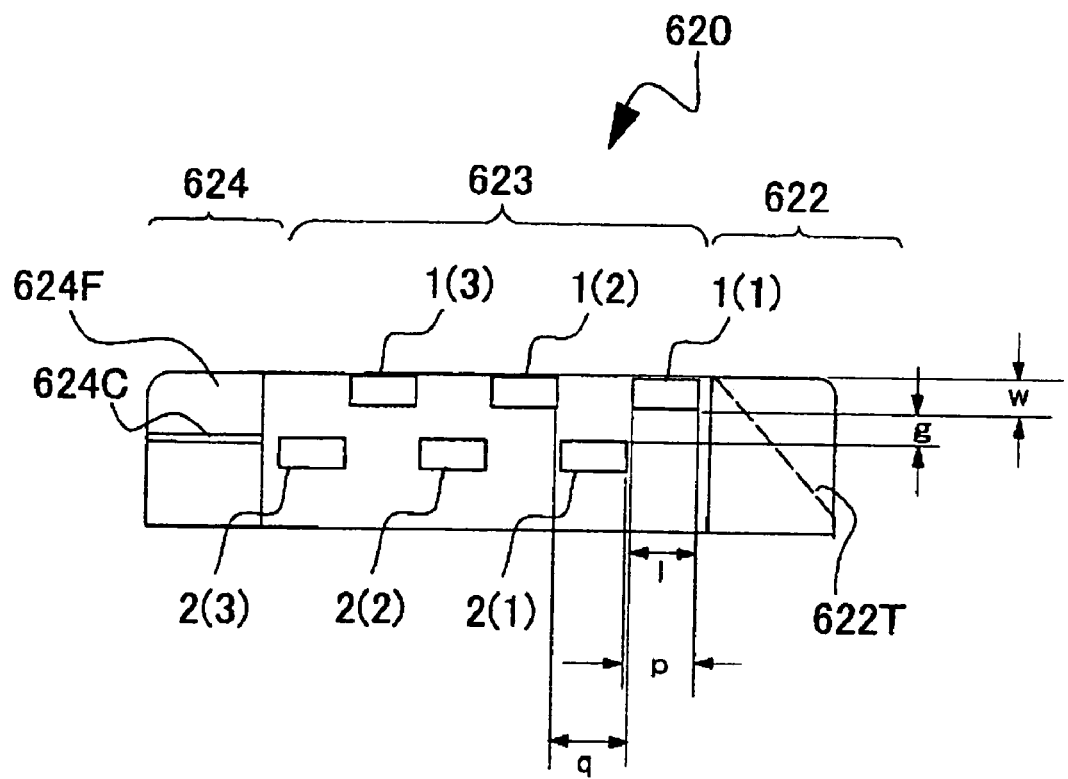
FIG. 18 is a side view shown from the direction of Z5 shown in FIG. 16.

In the second exemplary embodiment, a side fin portion 628 including a plurality of small fins which are disposed in a zigzag shape is provided to one side of the cover main body 623 as shown in FIGS. 16 to 18, whereas the two columns of straight fins are provided in the first exemplary embodiment.

More specifically, the side fin portion 628 includes 6 small fins for every side of the cover main body 623, that is, 12 small fins for the overall cover member 620 as shown in FIGS. 16 to 18. Referring to the only one side plane, the side fin portion 628 include, for example, a first column of fins and a second column of fins which are passed in the left and right directions in the figure, respectively, as shown in FIG. 18. In addition, the first column of fins includes three small fins 1(1), 1(2), and 1(3), and the second column of fins includes three small fins 2(1), 2(2), and 2(3).

All of the small fins 1(1) to 1(3), or 2(1) to 2(3) have the same shape and size. It is preferable that the height h (see FIGS. 16 and 17) and width w (see FIGS. 17 and 18) of the small fins 1(1) to 1(3) and 2(1) to 2(3) are 0.5 mm or more and 0.3 mm or more, respectively.

In the second exemplary embodiment, the relation between the first and second columns of fins is as follows. The small fin 2(1) constituting the second column of fins is disposed to correspond to the location of the gap between the small fins 1(1) and 1(2) which constitute the first column of fins and are adjacent to each other. Similarly, the small fin 2(2) is disposed to correspond to the location of the gap between the small fins 1(2) and 1(3).

In addition, in a different point of view, the small fin 1(2) is disposed to correspond to the location of the gap between the small fins 2(1) and 2(2), and the small fin 1(3) is disposed to correspond to the location of the gap between the small fins 2(2) and 2(3). In short, in the second exemplary embodiment, the small fins 1(1) to 1(3) constituting the first column of fins and the small fins 2(1) to 2(3) constituting the second column of fins are formed not to be overlapped to each other and in different manners.

In particular, in the second exemplary embodiment, the size q of the gap between the small fins 1(1) and 1(2), for example, is longer than the length 1 of the small fin 2(1). This relation is suitable for all the aforementioned small fins.

Furthermore, the pitch p (see FIG. 18) between the small fins 1(1) to 1(3) constituting the first column of fins is 3 mm or more. The pitch p between the small fins 2(1) to 2(3) constituting the second column of fins is the same as that of the first column of fins.

In addition, the gap g (see FIGS. 17 and 18) between the first and second columns of fins is 1 mm or more. By doing so, the same functions and effects as those of the first exemplary embodiment, where the gap g between the two columns of straight fins is 1 mm or more, can be obtained, which will be described again later.

Since the side fin portion 628 is provided, the functions and effects obtained in the second exemplary embodiment are as follows. Firstly, in the second exemplary embodiment, the flow of the cooling air, as shown in FIG. 15, can be also obtained, so that the cooling of the cover member 620, and moreover, the cooling of the electro-optical device 500 can be effectively obtained.

Furthermore, particularly in the second exemplary embodiment, the aforementioned functions and effects can be enhanced by the side fin portion 628.

Firstly, since each of the small fins 1(1) to 1(3) and 2(1) to 2(3) can be formed not to be overlapped to each other and in different manners, the small fins 1(1) to 1(3) and 2(1) to 2(3) are disposed with a suitable density and the function of the heat dissipation in each of the small fins can be still obtained. For example, in FIG. 18, assuming that each of the small fins 2(1), 2(2), and 2(3) is located at the vicinity (just below the figure) of the small fins 1(1), 1(2), and 1(3), the small fins 2(r) and 1(r) (herein, r=1, 2, 3) dissipate heat to each other so that ambient temperature (particularly, the temperature of the air between both small fins 2(r) and 1(r)) is raised, and thus, the heat in the both small fins 2(r) and 1(r) is considered to be difficult to dissipate. However, in the second exemplary embodiment, the occurrence of the problem can be avoided. This effect can be supported by the construction that the size q of the gap between the small fins is longer than the length 1 of the small fins, and moreover, the construction that the pitch p between the small fins constituting each of the first and second columns of fins is 3 mm or more.

Secondly, since the gap g between the first and second columns of fins is 1 mm or more, even the cooling air having low static pressure and amount can be blown between the first and second columns of fins similarly to the first exemplary embodiment. Therefore, the characteristics on the heat dissipation of the fins can be enhanced, and even in the second exemplary embodiment, it is possible to further enhance the capability of the heat dissipation of the overall cover member 620. In addition, since the side fin portion 628 or each of the small fins 1(1) to 1(3) and 2(1) to 2(3) according to the second exemplary embodiment is provided to correspond with the flow of the cooling air similar to the first exemplary embodiment, the substantially same functions and effects as those of the first exemplary embodiment can be obtained in this point of view.

In other words, in the second exemplary embodiment, in addition to the cooling function of the cover member 620, since the each of the small fins 1(1) to 1(3) and 2(1) to 2(3) constituting the side fin portion 628 is formed not to be overlapped or in different manners as described above, the unique functions and effects can be obtained as follows. By doing so, the formation of the fins in a "zigzag" arrangement can be relatively easily performed. For example, the fins having such a shape can be suitably formed by an injection molding process, etc., described below. That is, two molds of a zigzag shape are prepared by forming mount parts and valley parts alternately. The two molds are disposed in a manner that the mount parts or the valley parts of the one mold are engaged with the valley parts or the mount parts of the other mold and a predetermined gap is formed between the top portion of the mount mold and the bottom portion of the valley mold. And then, the injection molding is carried out through the gap, so that the fins in the zigzag arrangement aspect as described above can be easily obtained. In this case, the mold extraction inevitably involved in the aforementioned manufacturing process can be easily performed. It is preferable that the two molds are moved apart from each other.

An Electro-Optical Device Encased in a Mounting Case; Third Embodiment

Figure 19:
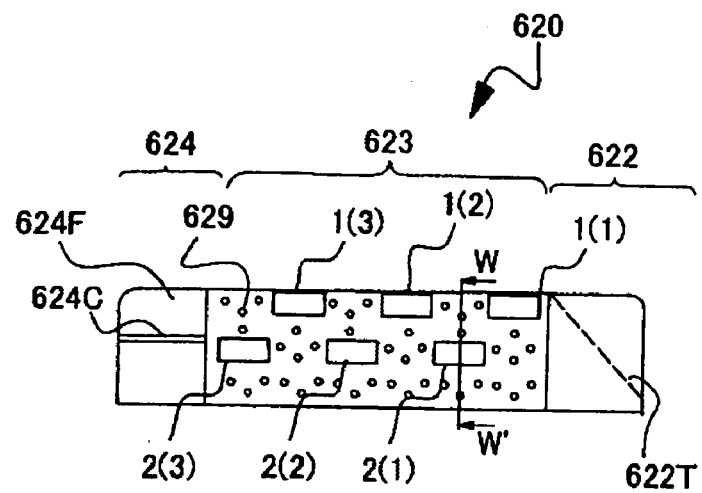
FIG. 19 is a view having the same purpose as FIG. 18, but is different from the FIG. 18 in that dimples are formed in a side fin portion.
Figure 20:
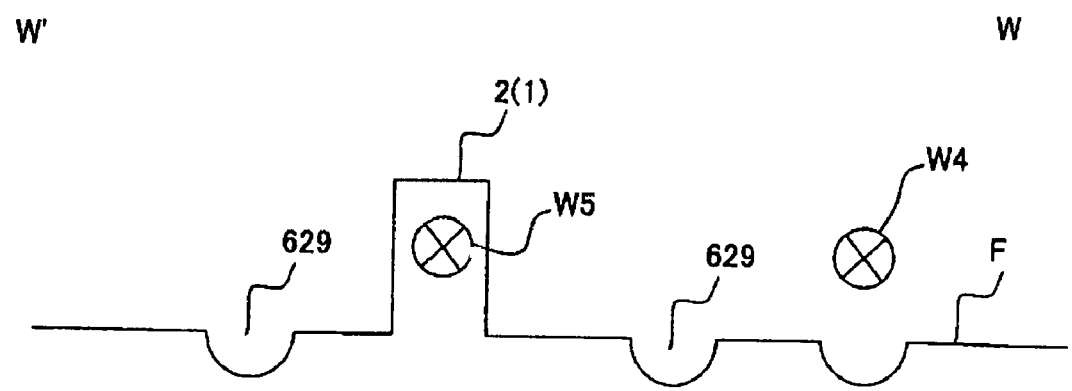
FIG. 20 is a cross-sectional view taken along the plane W–W' shown in FIG. 19 and particularly illustrates only the cross-sectional shapes of the small fins and the dimples.

Next, an electro-optical device encased in the mounting case according to a third exemplary embodiment will be described with reference to FIGS. 19 and 20. FIG. 19 which is a view having the same purpose as FIG. 18 illustrates a case having a different shape of a side fin portion to which dimples are provided. FIG. 20 which is a cross-sectional view taken at the plane W–W' in FIG. 19, in particular, illustrates only the cross-sectional shapes of small fins and dimples. In addition, in the third exemplary embodiment, the constructions and effects of the main components of the aforementioned "projection display apparatus", "electro-optical device", and the "electro-optical device encased in the mounting case" are the same as those of the first embodiment. However, the side fin portion includes small fins in a zigzag arrangement as described in the second embodiment. Therefore, their descriptions will be omitted, and only the characteristic parts in the third exemplary embodiment will be described.

In the third exemplary embodiment, in addition to the side fin portion including a plurality of small fins disposed in the zigzag arrangement described in the second exemplary embodiment, dimples 629 are provided as shown in FIGS. 19 and 20. A plurality of the dimples 629 are disposed to fill gaps between the aforementioned small fins 1(1) to 1(3) and 2(1) to 2(3).

Since the dimples 629 are provided, the surface area of the cover member 620 can be also further increased. Therefore, according to the third exemplary embodiment, the more effective cooling of the cover member 620 can be implemented than those of the first and second exemplary embodiments, and thus, it is possible to implement the effective cooling of the electro-optical device 500.

In addition, in FIG. 20, the difference between the dimples 629 and the small fin 2(1) of the third exemplary embodiment is that they are protruded or recessed based on the "surface of the cover" as a reference plane F (see FIG. 20).

In some cases, the "dimple" referred to in an aspect of the present invention may have a property that "it never interrupts the flow of the cooling air blown to the electro-optical device encased in the mounting case." In the third exemplary embodiment, the dimples 629 are considered to have the property. Namely, as shown in FIG. 20, the dimples 629 never interrupt the flow of the cooling air W4 blown from the paper side to the opposite side in the figure. On the other hand, it can be understood from the aforementioned point of view that the small fin 2(1) in FIG. 20 does not entirely interrupt the flow of the cooling air (particularly, see the cooling air W5 in FIG. 20). Therefore, the difference between "the dimples" and "the fin" may be considered to be in this point of view.

In addition, in an aspect of the present invention, the specific shape of the "dimple" is not limited to a circle as viewed in plane as shown in FIGS. 19 and 20. For example, the shape includes a shape of a groove carved along its longitudinal direction.

In addition, the present invention is not limited to the aforementioned exemplary embodiments. Now, modified examples which are not dealt in the aforementioned exemplary embodiments but belong to the scope of the exemplary embodiment will be described.

First, although the side fin portions 627 and 628 in each of the exemplary embodiments are provided to extend in a straight shape from the cooling air introducing portion 622 to the cooling air discharging portion 624, the present invention is not limited to the shape. As described above, since the wind supplied from the fan 1300 in the liquid crystal projector 1100, as shown in FIG. 1, flows in whirls, the cooling air is not limited to the cooling air blown always straightly in the vicinity of the electro-optical device encased in the mounting case, that is, light valves 100R, 100G, and 100B. Therefore, although most of the fins according to an aspect of the present invention belong to this case, in a case where the flow situation of the cooling can be definitively obtained, the arrangement aspect of fins can be determined in consideration of the situation.

Figure 21:
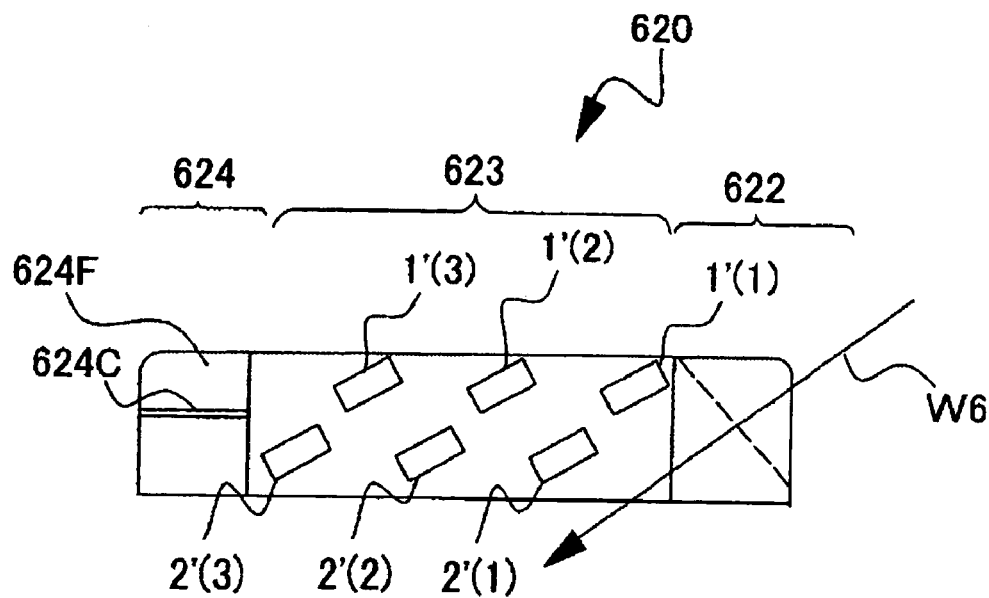
FIG. 21 is a view having the same purpose as FIG. 18 and illustrates a different arrangement of the small fins from that of the small fins shown in the FIG. 18.

In the specific example, for example, the arrangement aspect in FIG. 21 can be adopted. FIG. 21, which is a view having the same purpose as FIG. 18, illustrates a case having a different arrangement aspect of small fins. In FIG. 21, a cooling air W6 is blown in the so-called "slanted" manner in the vicinity of the electro-optical device encased in the mounting case. If it is expected with a high accuracy that the flow of the cooling air W6 is dominant even as totally seen, the fins are preferably disposed to correspond with this situation. Therefore, in fact, the small fin 1"(1) or the like is disposed in an inclined angle of 45° to correspond with the flow of the cooling air W6 in FIG. 21. By doing so, it is possible to effectively implement the cooling of the cover member 620 without excessively interrupting the flow of the cooling air W6.

Figure 22:
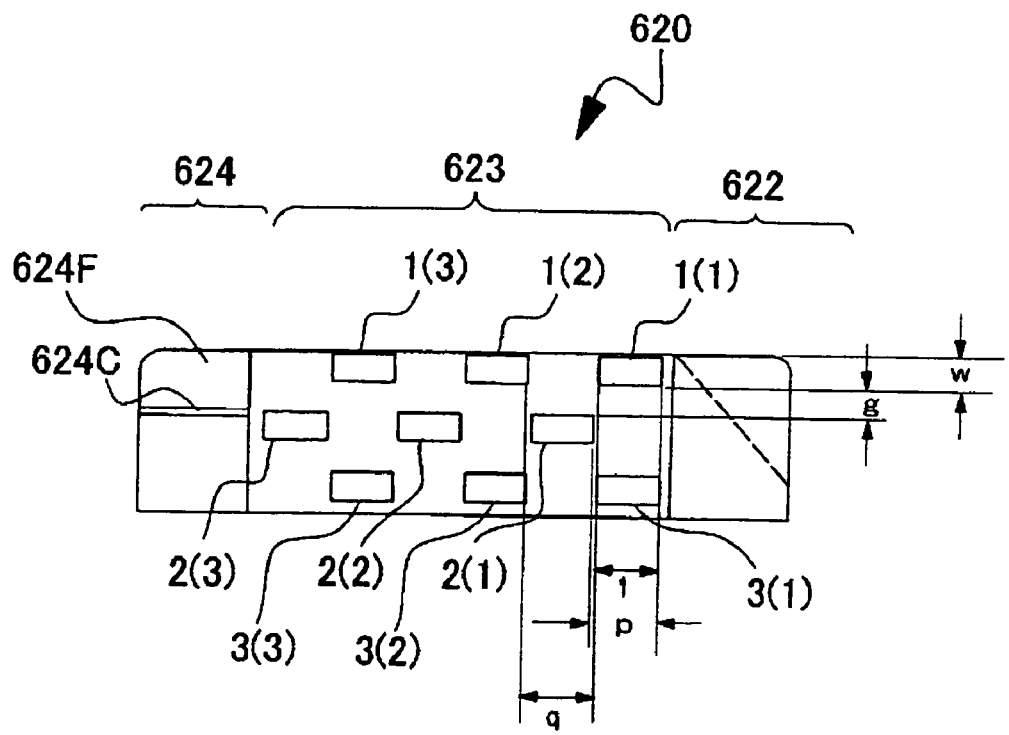
FIG. 22 is a view having the same purpose as FIG. 18 and illustrates an aspect in which three columns of small fins are provided.

Secondly, although all the side fin portions 627 and 628 in each of the exemplary embodiments are provided to have two columns of fins, in some case, the side fin portions may have the only one column of fins or more than three columns of fins as shown in FIG. 22. FIG. 22 which is a view having the same purpose as FIG. 18 illustrates a case having an arrangement of small fin groups in more than three columns. Namely, in the arrangement having more than three columns of fins as FIG. 22, it is preferable that the fins of each column are provided to meet the same arrangement as that of second exemplary embodiment. In other words, in FIG. 22, small fins 3(1), 3(2), and 3(3) constituting the third column of fins are disposed to correspond to the locations of the gaps among small fins 2(1), 2(2), and 2(3) constituting the second column of fins, and the length of each of the small fins 3(1), 3(2), and 3(3) is shorter than the size of gaps among the small fins 2(1), 2(2), and 2(3). In addition, the gap between the third column of fins and the second column of fins is 1 mm or more. In this case, the third column of fins and the second column of fins are considered to correspond to the "first column of fins" and the "second column of fins" in the present invention. In this way, the "first column of fins" and the "second column of fins" referred to in an aspect of the present invention are generally adapted irrespective of the number of columns of fins actually provided.

The present invention is not limited to the aforementioned exemplary embodiments, but it can be modified without departing from the scope and spirit of the present invention. The modified electro-optical device encased in the mounting cases, projection display apparatuses, and mounting cases also belong to the technical scope of the present invention. The electro-optical device include, for example, an electrophoresis apparatus, an electroluminescence apparatus, a plasma display apparatus, and an apparatus using an electron-emitting device, such as a field emission display apparatus, and a surface-conduction electron-emitter display apparatus, as well as a liquid crystal panel.

What is claimed is:

1. An electro-optical apparatus, comprising:
an electro-optical panel including:
  an image display region that receives light from an external source,
  a peripheral region at the periphery of the image display region,
  a side surface;
a plate that opposes a surface of the electro-optical panel, the plate including a side portion extending in parallel and in opposition with the side surface of the electro-optical panel;
a cover that, in cooperation with the plate, accommodates at least a portion of the peripheral region of the electro-optical panel, the cover including a side wall that opposes the side surface of the electro-optical panel, the side wall of the cover having an inner surface and an outer surface, the inner surface contacting the side portion of the plate and the outer surface including a plurality of fins at positions opposing the side portion of the plate.

2. The electro-optical apparatus according to claim 1, the fins increasing the surface area of the sidewall portion.

3. The electro-optical apparatus according to claim 1, the fins protruding outward from the surface of the cover.

4. The electro-optical apparatus according to claim 3, the fins being formed to correspond to the direction of the flow of cooling air which is supplied from the outside of the mounting case.

5. The electro-optical apparatus according to claim 3, the fins being provided in a straight shape.

6. The electro optical apparatus according to claim 3, the fins being arranged in a zigzag shape.

7. The electro-optical apparatus encased in the mounting case according to claim 6,
the fins, being arranged in the zigzag shape, include a first column of fins having a plurality of small fins, and a second column of fins extending in parallel with the first column of fins and having a plurality of small fins, and
one of the small fins of the plurality of fins that constitute the second column of fins being formed to be positioned adjacent to a gap between the small fins of the plurality of fins that constitute the first column of fins.

8. The electro-optical apparatus according to claim 7, the gap between the small fins being longer than a length of the small fin.

9. The electro-optical apparatus according to claim 7, a pitch between the small fins, which includes the gap between the small fins, being 3 mm or more.

10. The electro-optical apparatus according to claim 7, a height of the small fin being 0.5 mm or more, and a width of the small fin being 0.3 mm or more.

11. The electro-optical apparatus according to claim 1,
the fins including the first column of fins and a second column of fins extending in parallel with the first column of fins, and
a gap between the first column of fins and the second column of fins being 1 mm or more.

12. The electro-optical apparatus according to claim 1, the cover being made of a material of high heat conductivity.

13. A projection display apparatus, comprising:
the electro-optical apparatus according to claim 1;
the light source;
an optical system to guide the projection light into the electro-optical device;
a projection optical system to project the light emitted from the electro-optical device; and
a cooling air discharging portion to supply cooling air to the electro-optical apparatus.

14. An electro-optical apparatus according to claim 1, wherein the plate, cover, and the electro-optical device are stacked in a stacked direction, the fins of the cover including a tapered surface tapered in the stacked direction, the tapered surface having an arched surface that extends in the stacked direction.

15. An electro-optical apparatus, comprising:
an electro-optical device having an image display region on which projection light from a light source is incident; and
a mounting case including a plate disposed to face one surface of the electro-optical device and a cover to cover the electro-optical device, a portion of the cover abutting against the plate, the mounting case accommodating the electro-optical device by holding at least a portion of a peripheral region located at a circumference of the image display region of the electro-optical device with at least one of the plate and the cover,
the cover having a surface area increasing portion to increase the surface area thereof,
the surface area increasing portion including dimples provided to form concave portions on the surface of the cover.

* * * * *